(12) United States Patent
Kinoshita et al.

(10) Patent No.: US 9,445,006 B2
(45) Date of Patent: Sep. 13, 2016

(54) IMAGE PROCESSING APPARATUS AND IMAGE PROCESSING METHOD FOR DISPLAYING A FOCUSED PORTION WITH EMPHASIS ON AN IMAGE

(71) Applicant: SONY CORPORATION, Tokyo (JP)

(72) Inventors: Masaya Kinoshita, Kanagawa (JP); Akira Sassa, Saitama (JP)

(73) Assignee: SONY CORPORATION, Tokyo (JP)

(*) Notice: Subject to any disclaimer, the term of this patent is extended or adjusted under 35 U.S.C. 154(b) by 8 days.

(21) Appl. No.: 14/247,573

(22) Filed: Apr. 8, 2014

(65) Prior Publication Data

US 2014/0313393 A1 Oct. 23, 2014

(30) Foreign Application Priority Data

Apr. 23, 2013 (JP) ................. 2013-090518

(51) Int. Cl.
  *H04N 5/232* (2006.01)
  *G06T 7/00* (2006.01)
  *G06T 11/60* (2006.01)

(52) U.S. Cl.
  CPC ......... *H04N 5/23293* (2013.01); *G06T 7/0081* (2013.01); *H04N 5/23212* (2013.01); *G06T 11/60* (2013.01); *G06T 2207/10024* (2013.01); *G06T 2207/20021* (2013.01); *G06T 2207/20148* (2013.01)

(58) Field of Classification Search
  None
  See application file for complete search history.

(56) References Cited

U.S. PATENT DOCUMENTS

| | | |
|---|---|---|
| 2008/0036900 A1* | 2/2008 | Nakajima .............. G03B 13/00 348/345 |
| 2009/0046942 A1* | 2/2009 | Aiso .................... G06T 7/0002 382/266 |
| 2009/0231454 A1* | 9/2009 | Miura ........................ 348/220.1 |
| 2010/0157127 A1* | 6/2010 | Takayanagi et al. .... 348/333.02 |
| 2012/0287308 A1* | 11/2012 | Kojima et al. ................ 348/239 |

FOREIGN PATENT DOCUMENTS

| | | |
|---|---|---|
| JP | 2003-046844 A | 2/2003 |
| JP | 2010-114556 A | 5/2010 |

* cited by examiner

*Primary Examiner* — Justin P Misleh
(74) *Attorney, Agent, or Firm* — Hazuki International, LLC

(57) ABSTRACT

There is provided an image processing apparatus including a focused area judgment unit that judges a focused area in target image data, a distribution information generation unit that generates distribution information of an edge evaluation value with the focused area judged by the focused area judgment unit as a target, a threshold value setting unit that variably sets a threshold value for judging an emphasis display portion using the distribution information generated by the distribution information generation unit, and a display data generation unit that selects an emphasis display portion in the image data using the threshold value set by the threshold value setting unit and generates display data for displaying the selected portion with emphasis.

8 Claims, 15 Drawing Sheets

Pickup image

Edge-emphasized image

| W1 | W2 | W3 | W4 | W5 | W6 |
|---|---|---|---|---|---|
| W7 | W8 | W9 | W10 | W11 | W12 |
| W13 | W14 | W15 | W16 | W17 | W18 |
| W19 | W20 | W21 | W22 | W23 | W24 |
| W25 | W26 | W27 | W28 | W29 | W30 |
| W31 | W32 | W33 | W34 | W35 | W36 |

FR

IMAGE PROCESSING APPARATUS AND IMAGE PROCESSING METHOD FOR DISPLAYING A FOCUSED PORTION WITH EMPHASIS ON AN IMAGE

CROSS REFERENCE TO RELATED APPLICATIONS

This application claims the benefit of Japanese Priority Patent Application JP 2013-090518 filed Apr. 23, 2013, the entire contents of which are incorporated herein by reference.

BACKGROUND

The present disclosure relates to an image processing apparatus, an image processing method, and a program for displaying with emphasis a focused portion on an image.

An image pickup apparatus such as a digital still camera and a digital video camera is known to have a function of displaying with emphasis a focused area on a picked-up image on an image pickup monitoring image (through image) and presenting it to a user for focusing or a focus check.

Japanese Patent Application Laid-open No. 2010-114556 (hereinafter, referred to as Patent Document 1) discloses a technique of varying, in a case where an outline of an object (edge portion) is to be displayed with emphasis, a threshold value for selecting a portion to be displayed with emphasis as so-called peaking.

Japanese Patent Application Laid-open No. 2003-46844 (hereinafter, referred to as Patent Document 2) discloses a technique of detecting, for facilitating an identification of a focused portion, whether each image area is focused, and displaying with emphasis an edge of the focused area.

SUMMARY

Incidentally, when there are many edges in a target image in the case of displaying the edges with emphasis as described above, the number of emphasis display portions becomes too large, and thus it becomes difficult to see the image. On the contrary, in an image with a small contrast, an edge is hardly emphasized.

In the case of the technique disclosed in Patent Document 1, by varying the threshold value for determining a portion to be displayed with emphasis based on an image, the situation as described above is improved. However, the threshold value becomes low with respect to an image with many defocused portions that are out of focus, and emphasis display is made even with a slight edge, thus departing from the original purpose of emphasizing a focused portion.

Further, in the case of the technique disclosed in Patent Document 2, since the threshold value is fixed, the number of emphasis display portions becomes too large as described above when there are many edges in the image of the focused area, for example, thus resulting in a difficult-to-see image.

In this regard, there is a need for a technique that enables, by displaying with emphasis a focused portion on a picked-up image, an image to be presented to a user to be an easy-to-see image and a focused portion to be presented appropriately irrespective of a target image content.

First, according to an embodiment of the present disclosure, there is provided an image processing apparatus including: a focused area judgment unit configured to judge a focused area in target image data; a distribution information generation unit configured to generate distribution information of an edge evaluation value with the focused area judged by the focused area judgment unit as a target; a threshold value setting unit configured to variably set a threshold value used for judging an emphasis display portion using the distribution information generated by the distribution information generation unit; and a display data generation unit configured to select an emphasis display portion in the image data using the threshold value set by the threshold value setting unit and generate display data for displaying the selected portion with emphasis.

When the threshold value for selecting the emphasis display portion in the image data is fixed, the number of emphasis display portions becomes too large to result in a difficult-to-see image in the case of an image with many edges, and the emphasis display is hardly made in the case of an image with less edges. When the threshold value is varied according to an image, such a point can be improved, but an appropriate threshold value cannot be necessarily obtained depending on a state of the image (number of edges or focused state). In this regard, according to the embodiment of the present disclosure, the distribution information of the edge evaluation value is generated with the focused area of the image as a target, and the threshold value is set using the distribution information. In other words, an edge condition in the image is observed targeting only the focused area. As a result, the variable setting of the threshold value is not affected by the defocused portion.

Second, in the image processing apparatus according to the embodiment of the present disclosure, the display data generation unit may generate display data for displaying with emphasis a portion inside the focused area, that has been selected based on a result of a comparison with the threshold value, within the image data.

In other words, the portion to be displayed with emphasis is only the focused area. For example, even when there is a pixel whose edge evaluation value is higher than the threshold value outside the focused area, that portion is not displayed with emphasis.

Third, in the image processing apparatus according to the embodiment of the present disclosure, the threshold value setting unit may set emphasis effect amount information corresponding to the threshold value, and the display data generation unit may use the emphasis effect amount information in a pixel data conversion operation for display with emphasis.

The threshold value variably set based on the distribution information has the image state (number of edges etc.) reflected thereon. In this regard, by setting the emphasis effect amount information according to the threshold value, it becomes possible to perform emphasis display corresponding to the image state.

Fourth, in the image processing apparatus according to the embodiment of the present disclosure, the display data generation unit may set a luminance value of the emphasis display portion using the emphasis effect amount information.

In other words, the level of emphasis display is adjusted based on luminance.

Fifth, in the image processing apparatus according to the embodiment of the present disclosure, the distribution information generation unit may generate the distribution information of the edge evaluation value using a contrast differential obtained as a derivative value of a luminance between adjacent pixel data as the edge evaluation value.

An appropriate edge evaluation value is obtained as a derivative value of the luminance between adjacent pixel data.

Sixth, in the image processing apparatus according to the embodiment of the present disclosure, the threshold value setting unit may set, based on the distribution information generated by the distribution information generation unit, the threshold value using the edge evaluation value with which an accumulative pixel count from a distribution high-order side becomes a set pixel count ratio.

With this structure, the pixel count of the portion to be displayed with emphasis can be controlled.

Seventh, in the image processing apparatus according to the embodiment of the present disclosure, the threshold value setting unit may provide an upper limit and a lower limit to the threshold value to be set.

With this structure, the threshold value can be prevented from taking an extreme value.

According to an embodiment of the present disclosure, there is provided an image processing method including: judging a focused area in target image data; generating distribution information of an edge evaluation value with the judged focused area as a target; variably setting a threshold value used for judging an emphasis display portion using the generated distribution information; and selecting an emphasis display portion in the image data using the set threshold value and generating display data for displaying the selected portion with emphasis.

Accordingly, it becomes possible to provide easy-to-see emphasis display with an appropriate threshold value setting.

According to an embodiment of the present disclosure, there is provided a program that causes an operational processing apparatus to execute the processing of the image processing method described above.

According to the embodiments of the present disclosure, emphasis display that appropriately presents a focused portion to a user in an easy-to-see manner irrespective of a target image content can be realized.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, an embodiment of the present disclosure will be described in the following order:
<1. Structure and processing example of image processing apparatus of this embodiment>
<2. Structure of image pickup apparatus>
<3. Emphasis display processing in image pickup apparatus>
<4. Program and application to computer apparatus>
<5. Modified example>

Figure 1:
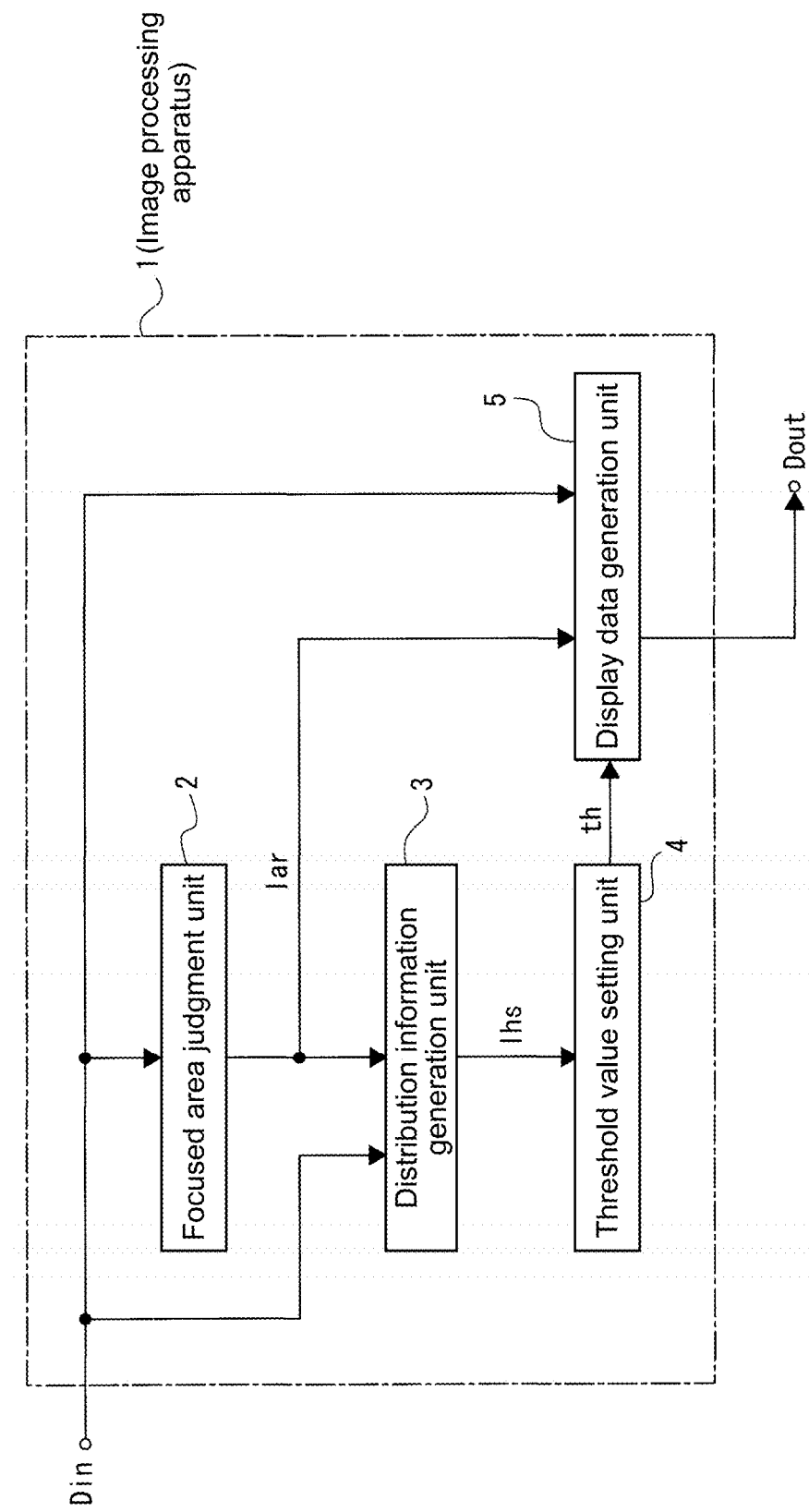
FIG. 1 is a block diagram showing an image processing apparatus according to an embodiment of the present disclosure.

1. Structure and Processing Example of Image Processing Apparatus of this Embodiment FIG. 1 shows a structural example of an image processing apparatus 1 of this embodiment.

The image processing apparatus 1 includes a focused area judgment unit 2, a distribution information generation unit 3, a threshold value setting unit 4, and a display data generation unit 5.

The image processing apparatus 1 generates and outputs, with input image data Din as a target, display data Dout for displaying an edge of a focused portion in an image with emphasis.

Figure 2A:
FIGS. 2A and 2B are explanatory diagrams of emphasis display according to the embodiment.
Figure 2B:

For example, from the image data Din as a picked-up image as shown in FIG. 2A, the display data Dout as an image displaying an edge with emphasis as shown in FIG. 2B is generated. The display data Dout is supplied to a display apparatus (not shown) so that an image as shown in FIG. 2B is displayed. As a result, a user can easily confirm a focused portion of the image data Din. It should be noted that although the emphasis display portion is indicated by a bold line in FIG. 2B, the emphasis display is performed by raising a luminance of an edge of the focused portion (or lowering a luminance in the image with a high luminance as a whole), converting a color of an edge into yellow, red, or the like, or thickening a line to be an edge in actuality.

In the image processing apparatus 1 shown in FIG. 1, the focused area judgment unit 2 judges a focused area in the target image data Din. The image data Din is a picked-up image data that has undergone a photoelectric conversion by an imager in an image pickup apparatus such as a digital still camera and predetermined processing. The focused area judgment unit 2 identifies a focused area and a defocused area in a single frame as the image data Din and outputs focused area information Iar indicating the focused area.

The distribution information generation unit 3 recognizes the focused area judged by the focused area judgment unit 2 based on the focused area information Iar. Then, the distribution information generation unit 3 generates distribution information Ihs of an edge evaluation value targeting the focused area in the single frame of the image data Din. The distribution information generation unit 3 creates, for example, a histogram of a pixel count corresponding to each edge evaluation value.

It should be noted that the edge evaluation value is a contrast differential value obtained as a derivative value of a luminance between adjacent pixel data, for example. A pixel with a high edge evaluation value corresponds to an edge on an image (e.g., outline portion). On the other hand, a pixel of a portion as a flat image has a low edge evaluation value.

The threshold value setting unit 4 uses the distribution information Ihs (histogram) generated by the distribution information generation unit 3 to variably set a threshold value th used for judging an emphasis display portion. In a case where there are many pixels having a high edge evaluation value (high edge ratio), for example, the threshold value th is set to be relatively high. On the other hand, in a case where there are many pixels having a low edge evaluation value (low edge ratio), the threshold value th is set to be relatively low.

The display data generation unit 5 selects an emphasis display portion in the image data Din using the threshold value th set by the threshold value setting unit 4 and generates the display data Dout for displaying the selected portion with emphasis. In other words, with a pixel whose edge evaluation value exceeds the threshold value th as an edge portion to be displayed with emphasis, such a pixel is selected as a target of the emphasis display. Then, the emphasis display is made by the method of raising a luminance of the pixel, changing color information, or the like. The display data Dout is generated as described above and output to a display apparatus (not shown).

It should be noted that the display data generation unit 5 generates the display data Dout for displaying with emphasis a pixel in the focused area designated by the focused area information Iar, that has been selected based on the comparison result with respect to the threshold value th, particularly in the image data Din of a single frame.

Accordingly, the display as shown in FIG. 2B is made with respect to the image of FIG. 2A.

Figure 3:
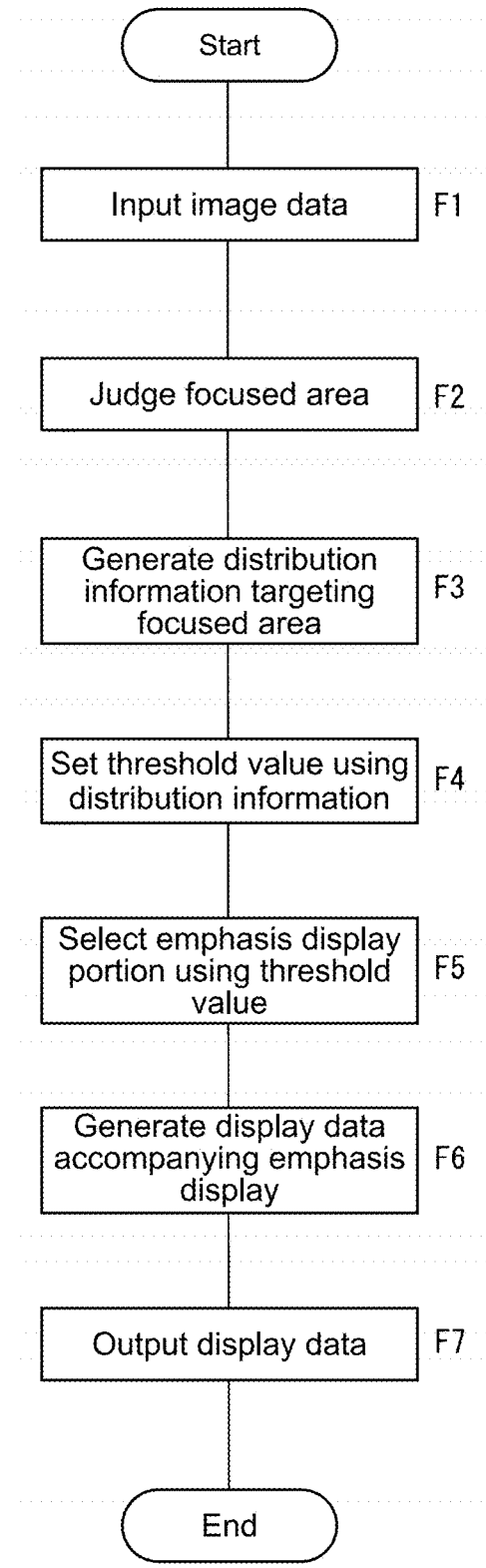
FIG. 3 is a flowchart showing an image processing method according to the embodiment.

FIG. 3 shows a processing procedure carried out by the image processing apparatus 1.

The processing shown in FIG. 3 is carried out every time a single frame of the image data Din is input in Step F1.

In Step F2, the focused area judgment unit 2 judges a focused area in the single frame and obtains focused area information Iar.

In Step F3, the distribution information generation unit 3 obtains an edge evaluation value of each pixel targeting the focused area indicated by the focused area information Iar and generates distribution information Ihs of the edge evaluation value. For example, for each pixel in the focused area, a value for evaluating edge-ness in an image (edge evaluation value), such as a derivative value of a luminance, is obtained.

Then, the pixel count of each edge evaluation value is calculated to generate a histogram (distribution information Ihs).

In Step F4, the threshold value setting unit 4 sets the threshold value th using the distribution information Ihs. For example, the threshold value th is set such that the edge evaluation values corresponding to 10% of the entire values are selected from a higher side.

In Step F5, the display data generation unit 5 selects a pixel whose edge evaluation value is higher than the threshold value th in the focused area indicated by the focused area information Iar and sets it as the emphasis display portion.

In Step F6, for the selected pixel, the display data generation unit 5 converts pixel data (luminance data or color data) for the emphasis display by the method of raising or lowering the luminance value, carrying out color information conversion, or the like. The converted image data becomes the display data Dout.

In Step F7, the display data generation unit 5 outputs the generated display data Dout.

By the processing described above, it becomes possible to perform emphasis display that appropriately presents an easily-to-see focused portion.

It should be noted that in the structure of FIG. 1, the image processing apparatus 1 including the focused area judgment unit 2, the distribution information generation unit 3, the threshold value setting unit 4, and the display data generation unit 5 can be realized by a CPU (Central Processing Unit), a DSP (Digital Signal Processor), or the like as an operational processing apparatus. Moreover, it is also possible to realize the respective units dispersively in a plurality of CPUs or a CPU, an image processing DSP, and the like, and realize the function of the image processing apparatus 1 as a combination operation with the operational processing apparatuses.

2. Structure of Image Pickup Apparatus

In descriptions below, an image pickup apparatus 10 incorporating the image processing apparatus 1 as described above is taken as an example, and a structure and operation (emphasis display of focused portion) thereof will be described in detail.

Figure 4:
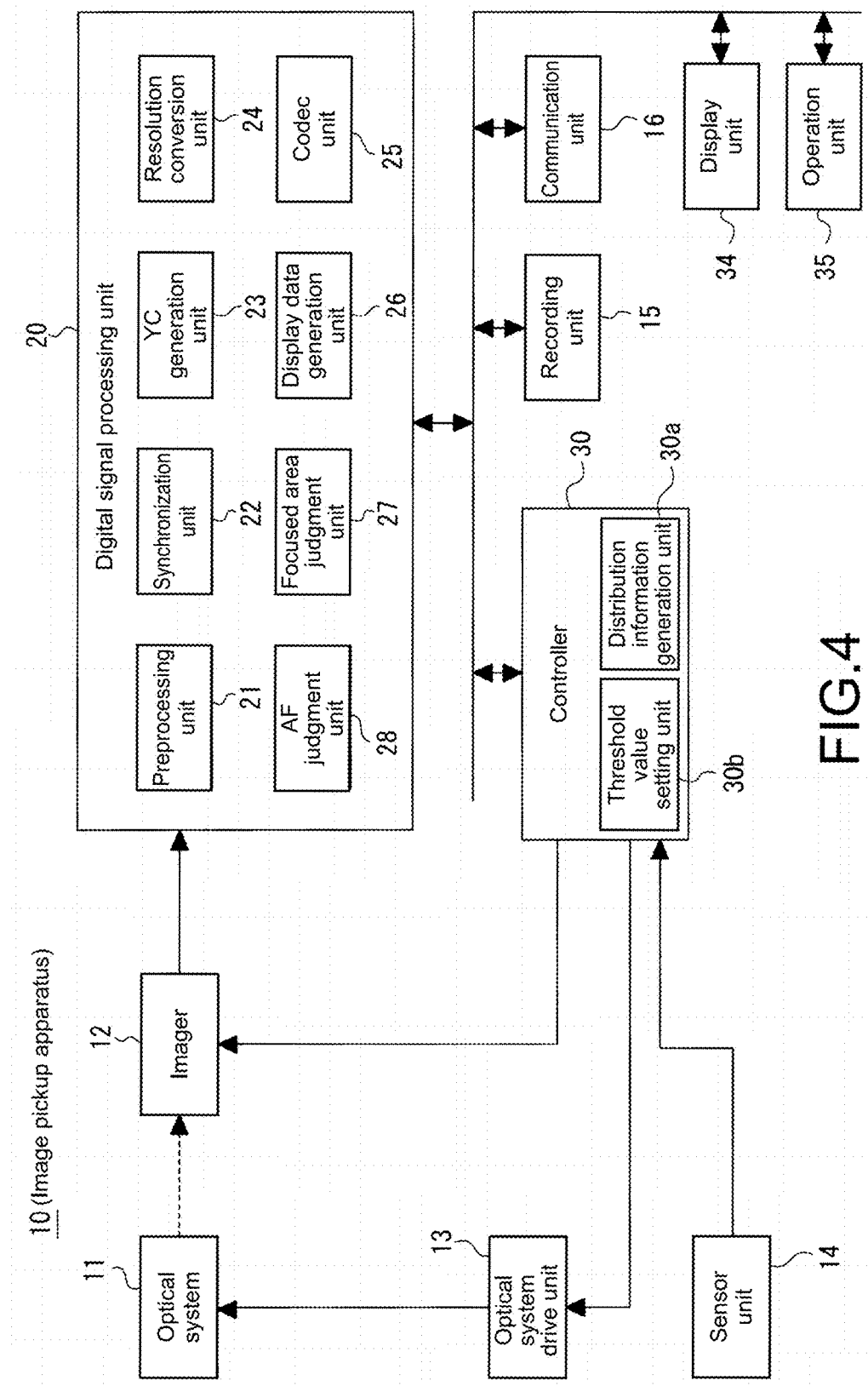
FIG. 4 is a block diagram showing an image pickup apparatus according to the embodiment.

The structural example of the image pickup apparatus 10 of this embodiment is shown in FIG. 4.

The image pickup apparatus 10 is a so-called digital still camera or a digital video camera that picks up/records a still image or a moving image and incorporates therein the image pickup apparatus according to the claims. The image pickup apparatus 10 executes emphasis display of a focused portion in a moving image display as a so-called through image (object monitoring image).

As shown in FIG. 4, the image pickup apparatus 10 includes an optical system 11, an imager 12, an optical system drive unit 13, a sensor unit 14, a recording unit 15, a communication unit 16, a digital signal processing unit 20, a controller 30, a display unit 34, and an operation unit 35.

The optical system 11 includes a lens such as a cover lens, a zoom lens, and a focus lens and a diaphragm mechanism. By the optical system 11, light from an object is collected by the imager 12.

The imager 12 includes an image pickup device of a CCD (Charge Coupled Device) type, a CMOS (Complementary Metal Oxide Semiconductor) type, and the like.

The imager 12 carries out CDS (Correlated Double Sampling) processing, AGC (Automatic Gain Control) processing, and the like on electric signals obtained by the photoelectric conversion by the image pickup device and also carries out A/D (Analog/Digital) conversion processing. Then, the image pickup signals as digital data are output to the subsequent digital signal processing unit 20.

Under control of the controller 30, the optical system drive unit 13 drives the focus lens of the optical system 11 and executes a focus operation. The optical system drive unit 13 also drives the diaphragm mechanism of the optical system 11 under control of the controller 30 and executes an exposure adjustment. Under control of the controller 30, the optical system drive unit 13 also drives the zoom lens of the optical system 11 and executes a zoom operation.

It should be noted that in addition to the drive as an autofocus in which the controller 30 controls the operation of the optical system drive unit 13 according to a focused state detection of a picked-up image, the focus lens is driven as a manual-focus in which the controller 30 controls the operation of the optical system drive unit 13 according to an operation of a focus operator made by the user.

The digital signal processing unit 20 is structured as an image processing processor by a DSP and the like. The digital signal processing unit 20 carries out various types of signal processing on the digital signals from the imager 12 (picked-up image data).

For example, the digital signal processing unit 20 includes a preprocessing unit 21, a synchronization unit 22, a YC generation unit 23, a resolution conversion unit 24, a codec unit 25, a display data generation unit 26, a focused area judgment unit 27, and an autofocus judgment unit 28 (hereinafter, referred to as AF judgment unit).

The preprocessing unit 21 carries out clamp processing of clamping a black level of R, G, and B to a predetermined level, correction processing among color channels of R, G, and B, and the like on the picked-up image data from the imager 12.

The synchronization unit 22 carries out de-mosaic processing so that the image data of each pixel includes all color components of R, G, and B.

The YC generation unit 23 generates (separates) a luminance (Y) signal and a color (C) signal from the R, G, and B image data.

The resolution conversion unit 24 executes resolution conversion processing on the image data subjected to the various types of signal processing.

The codec unit 25 carries out, for example, encoding processing for recording or communication on the image data subjected to the resolution conversion processing.

The focused area judgment unit 27 inputs the picked-up image data subjected to the processing of the synchronization unit 22, for example, identifies a focused area and a defocused area in a single frame as the picked-up image data, and outputs focused area information indicating the focused area to the controller 30.

Figures 5A, 5B:
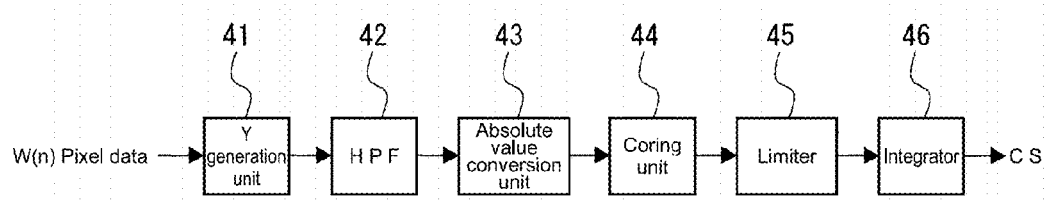
FIGS. 5A and 5B are explanatory diagrams of a focused area judgment according to the embodiment.

Specifically, the focused area judgment unit 27 divides the picked-up image data of a single frame into a large number of areas as shown in FIG. 5A, for example. The example shown in the figure is a mere explanatory example, but areas are set like areas w1 to w36. The actual division number of areas only needs to be set as appropriate.

A judgment is made on which of a focused area and a defocused area each of the areas w1 to w36 is.

For example, processing as shown in FIG. 5B is carried out for one area w(n). In other words, processing from a Y generation unit 41 to an integrator 46 is carried out for each pixel data constituting the area w(n).

A Y signal is simply generated by the Y generation unit 41. Then, the generated Y signal is subjected to a high-frequency extraction by an HPF (High-pass filter) 42 and further converted into an absolute value by an absolute value conversion unit 43. In other words, a high-frequency component is extracted as an absolute value. Then, a high-frequency component noise removal is carried out in a coring unit 44, and limiter processing is carried out by a limiter 45. After that, integration processing is carried out by the integrator 46.

In other words, for each area w(n), high-frequency components of image data constituting the area w(n) are integrated, and an evaluation value CS is obtained as a result of the integration. The edge components become prominent in the focused area, with the result that the evaluation value CS as the integration value of the high-frequency components becomes high. Therefore, by comparing the evaluation value CS with a predetermined focused area judgment threshold value, judgment information indicating which of the focused area and the defocused area the area w(n) is can be obtained.

The focused area judgment unit 27 judges which of the focused area and the defocused area each of the areas w1 to w36 is as described above, for example, and outputs the focused area information as the judgment result to the controller 30.

It should be noted that the focused area judgment may be performed by setting areas having a circular shape, a polygonal shape, and the like or an indefinite shape in addition to the area in a square shape.

Under control of the controller 30, the display data generation unit 26 generates, for example, display data as a through image to be output to the display unit 34.

The display data as a through image is basically data of each frame as picked-up image data (main image) subjected to a resolution conversion by the resolution conversion unit 24. The display data generation unit 26 normally generates display data for displaying a through image by the picked-up image data. The display data is supplied to the display unit 34 so that through image display is executed.

Further, in executing emphasis display, the display data generation unit 26 uses the threshold value th to be described later that has been received from the controller 30 to select a pixel to be displayed with emphasis and generates display data for displaying the selected portion with emphasis. The threshold value th is variably set by the controller 30 by the processing to be described later. The display data generation unit 26 uses the threshold value th variably set for each frame image data to select a pixel to be displayed with emphasis for each frame as the through image. Then, by the method of raising and lowering the luminance value, carrying out a color information conversion, and the like with respect to the selected pixel, for example, the pixel data (luminance data or color data) is converted so that the emphasis display can be performed. The converted image data is transferred to the display unit 34 as display data being a through image to be displayed with emphasis.

It should be noted that the display data generation unit 26 to be described later also receives an emphasis effect parameter EF together with the threshold value th from the controller 30. The emphasis effect parameter EF is a parameter for controlling a level of emphasis display. For example, the display data generation unit 26 sets the luminance value for emphasis display according to the emphasis effect parameter EF.

It should be noted that although the focused area judgment unit 27 and the display data generation unit 26 are functional structures executed by the digital signal processing unit 20 in the example shown in FIG. 4, this is merely an example, and the processing as the focused area judgment unit 27 and the display data generation unit 26 may be executed by the controller 30.

In the autofocus operation, the AF judgment unit 28 checks a current focus state of the frame image data. For example, by a high-frequency component energy detection of image data, an evaluation value for judging a focus state is obtained. During the autofocus operation, the controller 30 causes the optical system drive unit 13 to execute drive of the focus lens while checking the evaluation value from the AF judgment unit 28 to thus control the focused state.

The controller 30 is constituted of a microcomputer (operational processing apparatus) including a CPU, a ROM (Read Only Memory), a RAM (Random Access Memory), and a flash memory.

The CPU collectively controls the entire image pickup apparatus 10 by executing programs stored in the ROM, the flash memory, and the like.

The RAM temporarily stores data, programs, and the like as a working area of the CPU in performing various types of data processing.

The ROM and the flash memory (nonvolatile memory) store, in addition to an OS (Operating System) used by the CPU to control the respective units and content files such as an image file, application programs, firmware, and the like used for various operations. In this example, a program for executing processing for the emphasis display function is also stored in particular.

Such a controller 30 controls operations of the requisite units regarding instructions of various types of signal processing in the digital signal processing unit 20, an image pickup operation or recording operation corresponding to a user operation, a reproduction operation of a recorded image file, camera operations for zoom, focus, exposure adjustment, and the like, a user interface operation, and the like.

Further, in the case of this embodiment, the controller 30 includes functions as a distribution information generation unit 30a and a threshold value setting unit 30b.

The distribution information generation unit 30a grasps the focused area of the current frame based on the focused area information from the focused area judgment unit 27. For example, one or a plurality of focused areas are grasped out of the areas w1 to w36 described above. Then, targeting only the focused area, distribution information (histogram) of an edge evaluation value (contrast differential value) of a pixel included in the focused area is generated.

The threshold value setting unit 30b variably sets the threshold value th used for judging the emphasis display portion using the distribution information generated by the distribution information generation unit 30a. Then, the threshold value th is supplied to the display data generation unit 26.

The controller 30 including the distribution information generation unit 30a and the threshold value setting unit 30b as described above generates the distribution information for each frame of the picked-up image data and sets the threshold value th based on the distribution information in cooperation with the digital signal processing unit 20. The threshold value setting unit 30b also sets the emphasis effect parameter EF corresponding to the threshold value th.

It should be noted that the distribution information generation unit 30a and the threshold value setting unit 30b may be realized as functions of the digital signal processing unit 20.

The display unit 34 is a display unit that performs various types of display with respect to the user (photographer etc.) and includes a display device such as an LCD (Liquid Crystal Display) and an organic EL (Electro-Luminescence) display formed on a casing of the image pickup apparatus 10, for example. It should be noted that the display unit 34 may be formed using an LCD, an organic EL display, and the like in a form of a so-called viewfinder.

The display unit 34 is constituted of the display device and a display driver that causes the display device to execute display. The display driver executes various types of display on the display device based on an instruction from the controller 30. For example, the display driver displays a reproduction of a still image or moving image picked up and recorded onto a recording medium, and causes a through image as a moving image obtained by the picked-up image data of each frame that has been picked up during release (shutter operation) standby to be displayed on a screen of the display device according to the display data from the display data generation unit 26. The emphasis display on the through image is also performed. Moreover, the display unit 34 causes various operation menus, icons, messages, and the like, that is, GUIs (Graphical User Interfaces) to be displayed on the screen.

The operation unit 35 includes an input function for inputting a user operation and transmits a signal corresponding to the input operation to the controller 30.

The operation unit 35 is realized as various operators provided on the casing of the image pickup apparatus 10, a tough panel formed on the display unit 34, and the like.

As the operators on the casing, there are a reproduction menu activation button, a determination button, arrow keys, a cancel button, a zoom key, a slide key, a shutter button (release button), a focus ring, and the like.

Various operations may also be realized by the touch panel and a touch panel operation using an icon, a menu, and the like displayed by the display unit 34.

The recording unit 15 is constituted of, for example, a nonvolatile memory, and functions as a storage area that stores an image file (content file) of still image data, moving image data, and the like, image file attribute information, a thumbnail image, and the like.

The image files are stored in the forms of JPEG (Joint Photographic Experts Group), TIFF (Tagged Image File Format), GIF (Graphics Interchange Format), and the like.

The actual form of the recording unit 15 vary. For example, the recording unit 15 may be a flash memory incorporated into the image pickup apparatus 10 or may take a form of a memory card detachable with respect to the image pickup apparatus 10 (e.g., portable clash memory) and a card recording/reproducing unit that performs recording/reproduction/access with respect to the memory card. Moreover, as a form incorporated into the image pickup apparatus 10, the recording unit 15 may be realized as an HDD (Hard Disk Drive) and the like.

Further, programs for causing the controller 30 to execute the processing for generating distribution information, setting a threshold value, and the like for emphasis display may be stored in the recording unit 15.

The communication unit 16 performs data communication and network communication with an external apparatus in a wired or wireless manner.

For example, the communication unit 16 performs communication of picked-up image data (still image file and moving image file) with an external display apparatus, recording apparatus, reproduction apparatus, and the like.

Furthermore, the communication unit 16 may exchange, as a network communication unit, various types of data with a server, terminal, and the like on a network by performing communication using various networks such as the Internet, a home network, and a LAN (Local Area Network).

The sensor unit 14 includes various sensors. A gyro sensor (angular velocity sensor), an acceleration sensor, and the like for detecting a movement of the entire image pickup apparatus 10, such as a hand movement and a position and movement of the image pickup apparatus (pan movement, tilt movement, etc.), are provided.

An illuminance sensor for detecting an external illuminance for an exposure adjustment and the like and a distance measurement sensor for measuring an object distance may also be provided.

Moreover, as the sensor unit 14, a zoom lens position sensor for detecting a position of the zoom lens in the optical system 11 and a focus lens position sensor for detecting a position of the focus lens may be provided in some cases.

Further, as the sensor unit 14, a sensor for detecting an opening amount of a mechanical iris diaphragm (diaphragm mechanism) may be provided in some cases.

The various sensors of the sensor unit 14 each transmit detected information to the controller 30. The controller 30 is capable of performing various types of control using the information detected by the sensor unit 14.

In the image pickup apparatus 10 as described above, the structural portions of the image processing apparatus 1 described with reference to FIG. 1 are as follows.

The structures corresponding to the focused area judgment unit 2, the distribution information generation unit 3, the threshold value setting unit 4, and the display data generation unit 5 of the image processing apparatus 1 shown in FIG. 1 become the focused area judgment unit 27, the distribution information generation unit 30*a*, the threshold value setting unit 30*b*, and the display data generation unit 26. In other words, the image processing apparatus 1 is realized by the digital signal processing unit 20 and the controller 30. It is of course possible to form the image processing apparatus 1 only on the controller 30 side or only the digital signal processing unit 20 side.

3. Emphasis Display Processing in Image Pickup Apparatus

Processing operation for displaying a focused portion with emphasis in the image pickup apparatus 10 structured as described above will be described. The emphasis display of a focused portion is carried out for facilitating focusing or a focus check by the user, for example. During autofocus, for example, the emphasis display of a focused portion is made when the user performs a focus check by pressing the shutter button halfway. Further, during manual-focus in which the user performs a focus ring operation or the like, the emphasis display of a focused portion is made while the manual-focus operation is carried out, that is, while a through image is being displayed before the shutter button is fully pressed.

Figure 6:
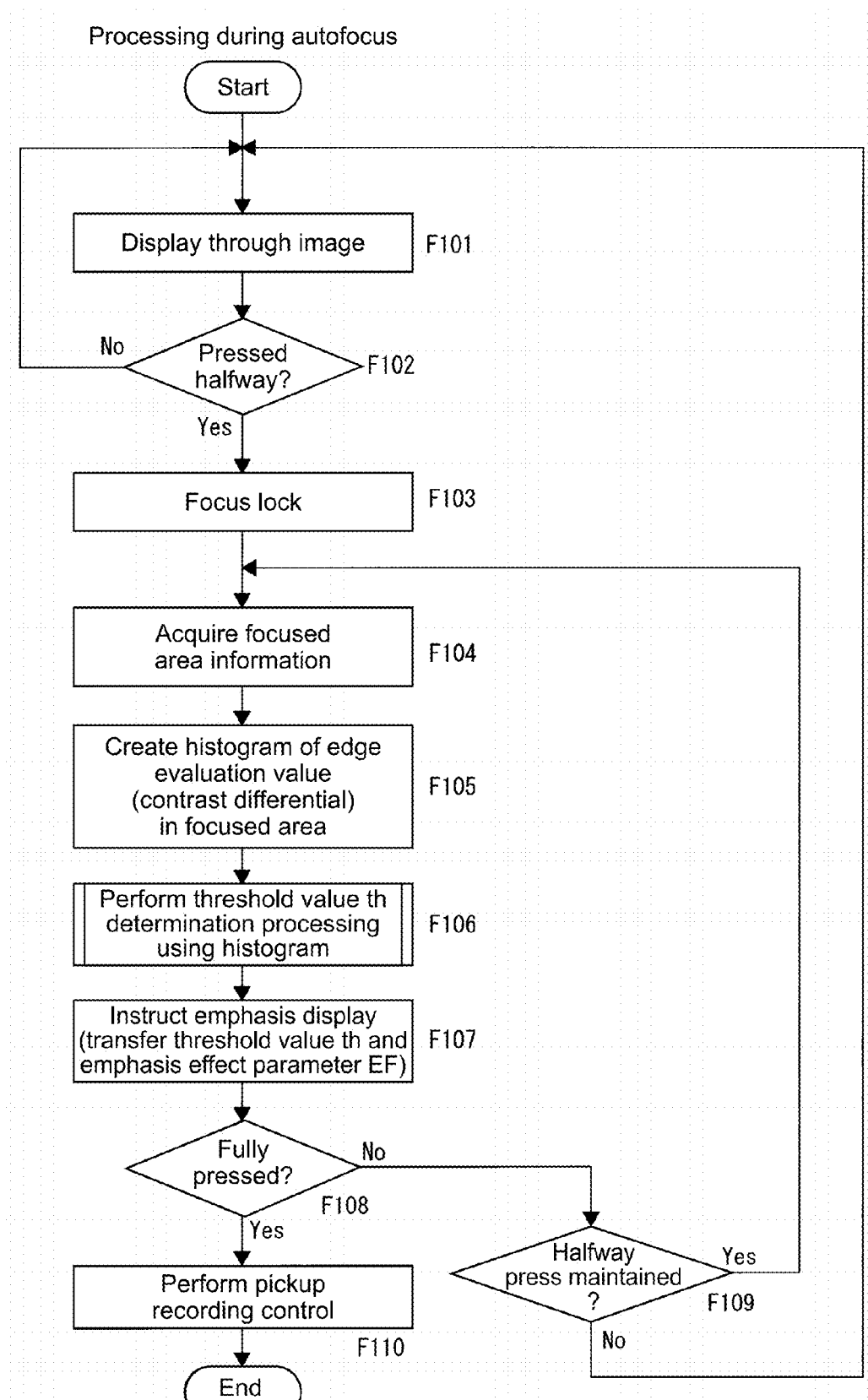
FIG. 6 is a flowchart showing processing carried out during autofocus of the image pickup apparatus according to the embodiment.
Figure 7:
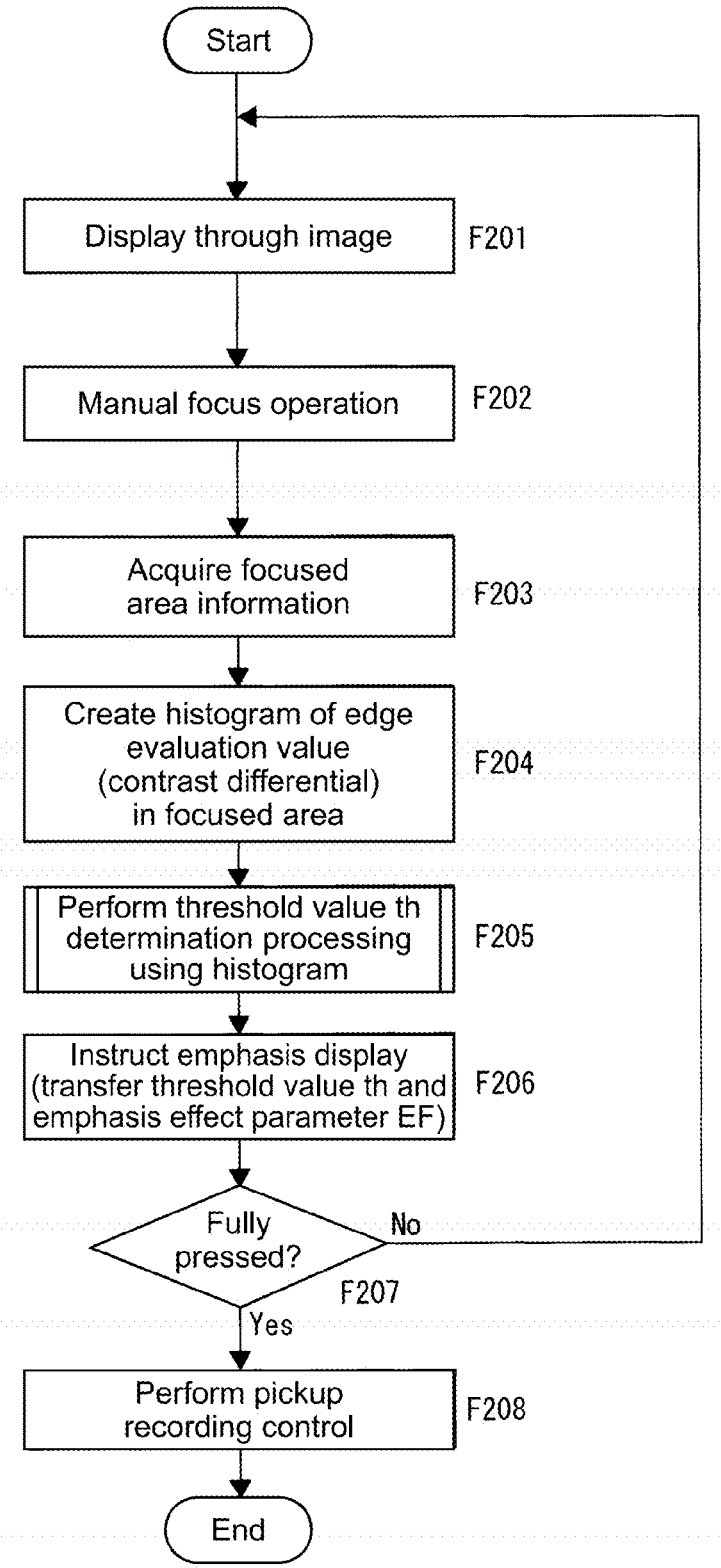
FIG. 7 is a flowchart showing processing carried out during manual-focus of the image pickup apparatus according to the embodiment.

First, the processing carried out during autofocus and manual-focus will be described with reference to FIGS. 6 and 7. The processing shown in FIGS. 6 and 7 is executed for the controller 30 to perform emphasis display while a through image is being displayed.

The processing carried out during autofocus will be described with reference to FIG. 6.

When the user picks up a still image using the image pickup apparatus 10, the controller 30 performs through image display control in Step F101. Specifically, the controller 30 causes the digital signal processing unit 20 (display data generation unit 26) to generate display data of a single frame as a through image based on the current picked-up image data of a single frame and output the display data to the display unit 34. Accordingly, through image display data is transferred to the display unit 34 in correspondence with each frame picked up by the imager, and through image display is performed by the display unit 34. The user can check the current object image on the screen of the display unit 34.

While the through image is being displayed, the controller 30 monitors a shutter button operation of the user and checks whether the button is pressed halfway in Step F102.

When the user presses the shutter button halfway, the controller 30 performs focus lock control in Step F103.

Specifically, as the autofocus control, the focus lens drive is executed by the optical system drive unit 13 while the evaluation value obtained by the AF judgment unit 28 is monitored to find a focused position and set a focused state.

After setting the focused state by the autofocus control as described above, the controller 30 performs emphasis display control in Steps F104 to F107.

First, in Step F104, the controller 30 acquires focused area information by the focused area judgment unit 27.

Next, in Step F105, the controller 30 creates a histogram of an edge evaluation value with the focused area as a target by the function of the distribution information generation unit 30*a*.

In Step F106, the controller 30 carries out threshold value determination processing for emphasis display using the created histogram by the function of the threshold value setting unit 30*b*.

In Step F107, the controller 30 hands over the determined threshold value th to the display data generation unit 26 and performs control so as to execute emphasis display on a through image. By the display data generation unit 26 selecting a pixel to be displayed with emphasis based on the threshold value th, carrying out a pixel data conversion for emphasis display, creating display data, and transferring it to the display unit 34, the focused portion is displayed with emphasis on the through image in the display unit 34, and thus the user only needs to see the screen to clearly check the focused portion.

It should be noted that in Step F107, the controller 30 also hands over the emphasis effect parameter EF to be described later to the display data generation unit 26. The display data generation unit 26 performs the pixel data conversion for emphasis display according to the emphasis effect parameter EF. For example, an emphasis effect amount such as a luminance value to be added is set as the emphasis effect parameter EF.

It should be noted that the processing of Steps F105 to F107 will be described later in detail.

In Step F108, the controller 30 checks whether the user has fully pressed the shutter button (i.e., release operation). When not fully pressed, the controller 30 checks whether the halfway press is maintained in Step F109.

While the halfway press is maintained, the processing of Steps F104 to F107 is repeated. Therefore, during the halfway press, the processing for emphasis display is repeated for each frame, and a focused portion is displayed with emphasis on the object image at that time point on the displayed through image.

When the halfway press is released, the controller 30 returns to Step F101 and instructs the display data generation unit 26 to perform normal through image display. In other words, the emphasis display is stopped. Therefore, in the case of this example, the emphasis display is made while the user is pressing the shutter button halfway, that is, while the user is performing the halfway press operation to execute autofocus and check the focused portion.

When the user fully presses the shutter button, the processing advances from Step F108 to Step F110, and the controller 30 performs image pickup recording control. In other words, the controller 30 instructs the digital signal processing unit 20 and the recording unit 15 to carry out an operation of recording the frame image data at this time as a still image. Accordingly, image pickup recording of one still image data is performed. It should be noted that the still image data to be recorded is of course picked-up image data not displayed with emphasis.

When using the autofocus as described above, the user presses the button halfway to check whether focusing is performed as intended by the emphasis display, and when focused as intended, fully presses the shutter button to perform still image pickup recording. When not focused as intended, the user only needs to repress the shutter button halfway or perform manual-focus as will be described below.

Subsequently, the processing carried out during manual-focus will be described with reference to FIG. 7.

When the user performs still image pickup by the image pickup apparatus 10 as in the autofocus, the controller 30 performs through image display control in Step F201. The display data generation unit 26 generates display data as a through image and transfers it to the display unit 34 so that through image display is performed in the display unit 34.

While the through image display is being performed, the user can perform a focus operation as a manual operation.

When the manual-focus operation is performed, the controller 30 controls the optical system drive unit 13 according to the operation to execute the focus lens movement corresponding to the operation. Alternatively, in a case where a structure that mechanically moves the focus lens according to an operation of the focus ring formed in a lens tube is adopted, the controller 30 does not need to perform the focus lens drive control in particular.

When focusing is performed by manual-focus as described above, since the emphasis display of a focused portion is performed during the through image display period (period before user fully presses shutter button), the controller 30 carries out the processing of Steps F203 to F206, which is the same as that of Steps F104 to F107 described above.

Then, the controller 30 checks whether the user has fully pressed the shutter button (i.e., release operation) in Step F207. While a release operation is not performed, the processing of Steps F201 to F206 is repeated. Therefore, until the user performs the release operation, emphasis display is performed if there is a focused portion while through image display is performed.

When the user fully presses the shutter button, the processing advances from Step F207 to Step F208, and the controller 30 performs image pickup recording control. In other words, the controller 30 instructs the digital signal processing unit 20 and the recording unit 15 to carry out an operation of recording the frame image data at that time as a still image. Accordingly, image pickup recording of single still image data is performed.

When focusing is performed by manual-focus as described above, the user can adjust the focus while looking at the emphasis display, and when an edge of an intended portion is emphasized, the user can judge that the portion is focused to thus perform still image pickup recording.

As described above with reference to FIGS. 6 and 7, in this embodiment, the processing of Steps F104 to F107 or the processing of Steps F203 to F206 is carried out as the processing for emphasis display. The processing for emphasis display will be described.

In Steps F104 and F203, the controller 30 acquires focused area information. This is the processing of receiving, from the focused area judgment unit 27, information indicating whether each area in the frame image data is a focused area as described above with reference to FIG. 5A.

In Steps F105 and F204, the controller 30 creates a histogram. In this case, the controller 30 references the acquired focused area information and creates a histogram targeting only the focused area.

For example, assuming that the areas w15, w16, w21, and w22 shown in FIG. 5A are judged as focused areas, a histogram of edge evaluation values is created while targeting pixels constituting the areas w15, w16, w21, and w22.

The edge evaluation value of each pixel is calculated as follows, for example.

For example, an absolute value of derivative values of a luminance in line with pixel data in an x direction (horizontal direction) (contrast differential with respect to pixels on both sides) is obtained. In addition, an absolute value of derivative values of a luminance in line with pixel data in a y direction (longitudinal direction) (contrast differential with respect to pixels above and below) is obtained. Further, an absolute value of derivative values of a luminance in line with pixel data in a first oblique direction (contrast differential with respect to upper-right pixel and lower-left pixel) is obtained. Furthermore, an absolute value of derivative values of a luminance in line with pixel data in a second oblique direction (contrast differential with respect to upper-left pixel and lower-right pixel) is obtained. A value as a sum of the 4 absolute values of the derivative values is used as the edge evaluation value.

The edge evaluation value is a value for judging whether each pixel is a pixel constituting a longitudinal, horizontal, or oblique edge image.

For example, the derivative value in the x direction becomes high for a pixel constituting a longitudinal line of an object in an image. Moreover, the derivative value in the y direction becomes high for a pixel constituting a horizontal line of the object in the image. In other words, the value as the edge evaluation value becomes high for a pixel constituting an edge.

It should be noted that a contrast differential with respect to 8 peripheral pixels about a certain pixel is being discussed herein by the 4 directions including the x direction, the y direction, the first oblique direction, and the second oblique direction. However, the number of directions does not always need to be 4, and the edge evaluation value may be calculated from 2 directions including the x direction and the y direction, for example. Alternatively, a contrast differential in line with pixel data in only the x direction or only the y direction, that is, one direction, may be used as the edge evaluation value.

Figure 8A:
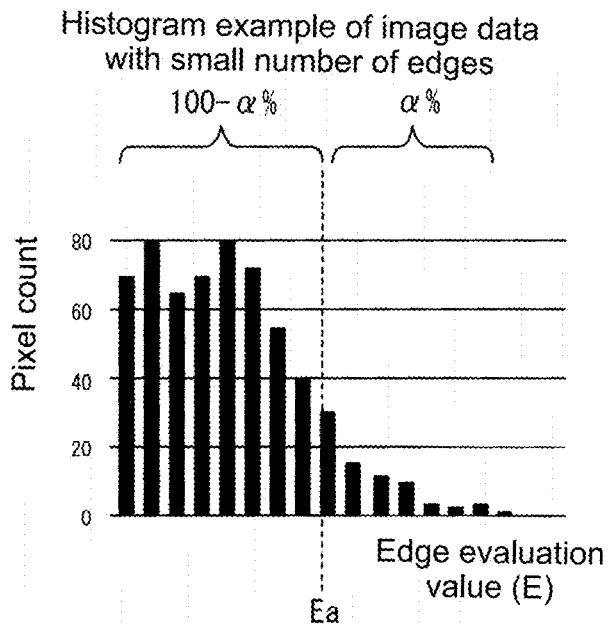
FIGS. 8A and 8B are explanatory diagrams of distribution information according to the embodiment.
Figure 8B:
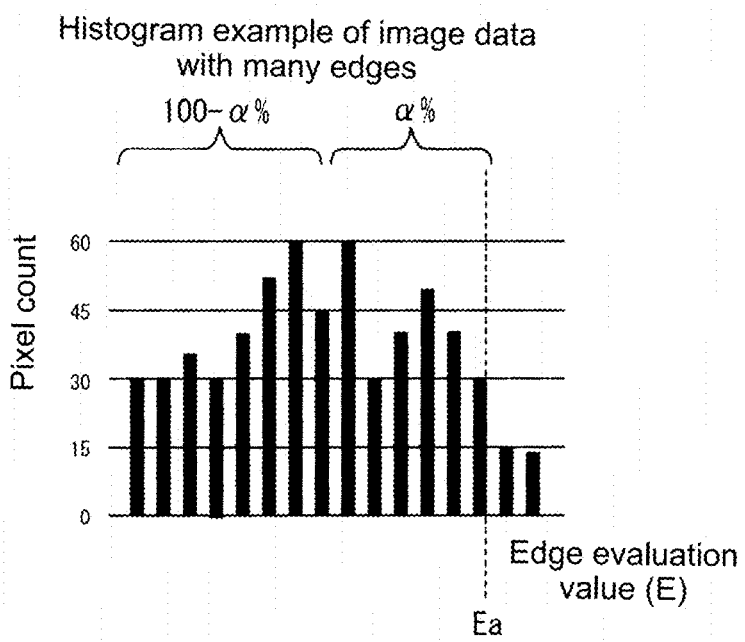

The edge evaluation value is obtained as described above for each pixel in the focused area to thus generate a histogram as shown in FIGS. 8A and 8B. The ordinate axis represents a pixel count, whereas the abscissa axis represents an edge evaluation value.

FIG. 8A is an example of the histogram of image data with a small number of edges. As shown in the figure, there are many pixels having a low edge evaluation value.

FIG. 8B is an example of the histogram of image data with a large number of edges. As shown in the figure, there are more pixels having a high edge evaluation value than in FIG. 8A.

As in this example, the pixel count distribution fluctuates based on a content of the image picked up as the object.

In Step F106 of FIG. 6 and Step F205 of FIG. 7, the threshold value th is set using the histogram created as described above.

Figure 9:
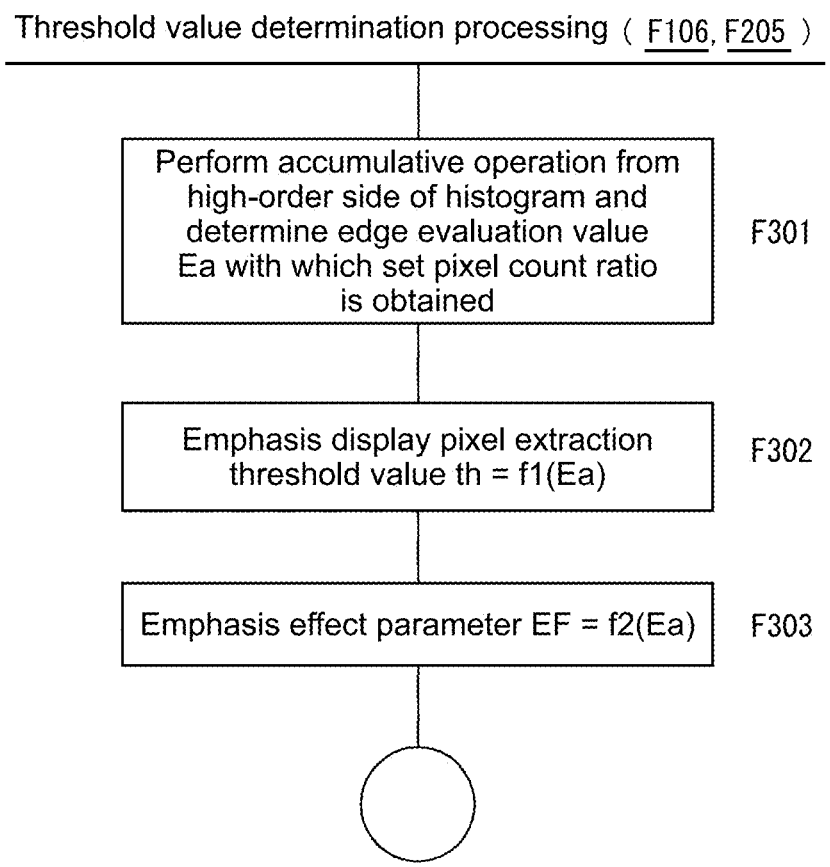
FIG. 9 is a flowchart showing threshold value determination processing according to the embodiment.

The threshold value determination processing of Step F106 or F205 is specifically shown in FIG. 9.

First, in Step F301, the controller 30 performs an accumulative operation from a high-order side of the histogram and judges an edge evaluation value Ea with which a set pixel count ratio is obtained. Specifically, the numbers from the high-order BIN of the histogram are accumulated, and a value of the BIN including a sample corresponding to an n-th number that is a % of the entire number, that is, the evaluation value of the BIN is judged.

As shown in the examples of FIGS. 8A and 8B, the edge evaluation value Ea of the BIN is obtained.

Next, in Step F302 of FIG. 9, the controller 30 sets the threshold value th for extracting an emphasis display pixel to f1 (Ea). Specifically, the edge evaluation value Ea is substituted into the function f1 and determined as the threshold value th. It should be noted that the function f1 may be a simple coefficient operation function (including coefficient=1), and thus the edge evaluation value Ea may be determined as the threshold value th as it is or may be subjected to a coefficient operation so that the threshold value th proportional to the edge evaluation value Ea is determined as the threshold value th. For example, it is also possible to use a function that sets the threshold value th in accordance with the number of edge components in a picked-up image as shown in FIG. 10A.

Figure 10A:
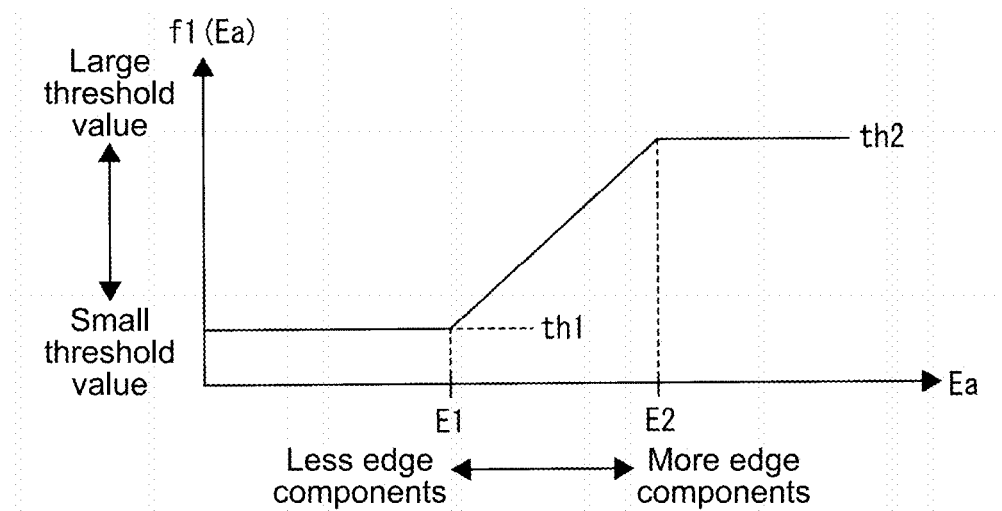
FIGS. 10A and 10B are explanatory diagrams of a threshold value and an emphasis effect amount according to the embodiment.

In the example of FIG. 10A, when the edge evaluation value Ea is higher than a predetermined value E2, threshold value th=th2 is set. When the edge evaluation value Ea is lower than a predetermined value E1, threshold value th=th1 is set. When the edge evaluation value Ea is within the range of the predetermined values E1 to E2, the threshold value th takes a value within the range of th1 to th2 according to the Ea value.

By limiting the range of the threshold value th to be within the range of th1 to th2 as described above, it is possible to avoid a state where the threshold value th becomes extremely low or high depending on the image state.

Subsequently, in Step F303 of FIG. 9, the controller 30 sets the emphasis effect parameter EF as EF=f2 (Ea). In other words, the edge evaluation value Ea is substituted into the function f2 and used as the emphasis effect parameter EF.

The emphasis effect parameter EF is a parameter indicating an emphasis effect amount. For example, when adding/subtracting or multiplying/dividing the luminance values of the pixel data for emphasis display, the emphasis effect parameter EF becomes a parameter for setting the addition/subtraction value or the multiplication/division value.

The function f2 may be a simple coefficient operation function (including coefficient=1), and thus the edge evaluation value Ea may be determined as the emphasis effect parameter EF as it is or may be subjected to a coefficient operation so that the emphasis effect parameter EF proportional to the edge evaluation value Ea is determined as the emphasis effect parameter EF. For example, it is also possible to use a function that sets the emphasis effect parameter EF in accordance with the number of edge components in a picked-up image as shown in FIG. 10B.

Figure 10B:
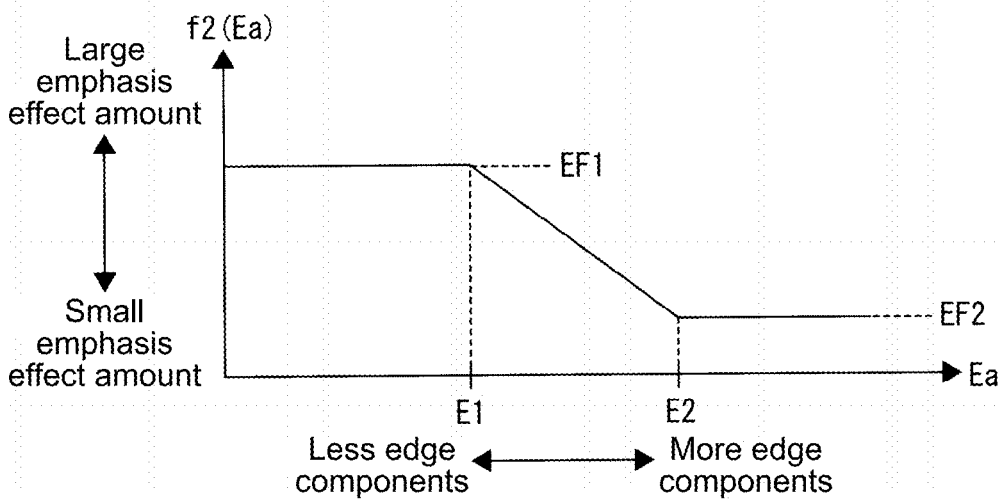

In the example of FIG. 10B, when the edge evaluation value Ea is higher than the predetermined value E2, emphasis effect parameter EF=EF2 is set. When the edge evaluation value Ea is lower than the predetermined value E1, emphasis effect parameter EF=EF1 is set. When the edge evaluation value Ea is within the range of the predetermined values E1 to E2, the emphasis effect parameter EF takes a value within the range of EF1 to EF2 according to the Ea value.

By limiting the range of the emphasis effect parameter EF to be within the range of EF1 to EF2 as described above, it is possible to avoid a state where the emphasis effect becomes too large or too small depending on the image state.

In the example of FIG. 10B, the emphasis effect amount becomes smaller as the number of edge components in an image increases. The large number of edge components means that there are many edges to be displayed with emphasis on the image. Therefore, when the emphasis effect amount is increased too much, there is a fear that the emphasis display sticks out too much to result in a bothersome image. In this regard, by lowering the emphasis effect amount when there are many edge components, user-friendly emphasis display can be provided by the display unit 34.

Upon determining the threshold value th in Step F106 of FIG. 6 and Step F205 of FIG. 7 and setting the emphasis effect parameter EF, the controller 30 hands over the threshold value th and the emphasis effect parameter EF to the display data generation unit 26 in Step F107 or F206 and instructs to generate display data for emphasis display.

In accordance with the processing of the controller 30 as described above, the digital signal processing unit 20 (display data generation unit 26) carries out the display data generation processing for emphasis display.

Figure 11:
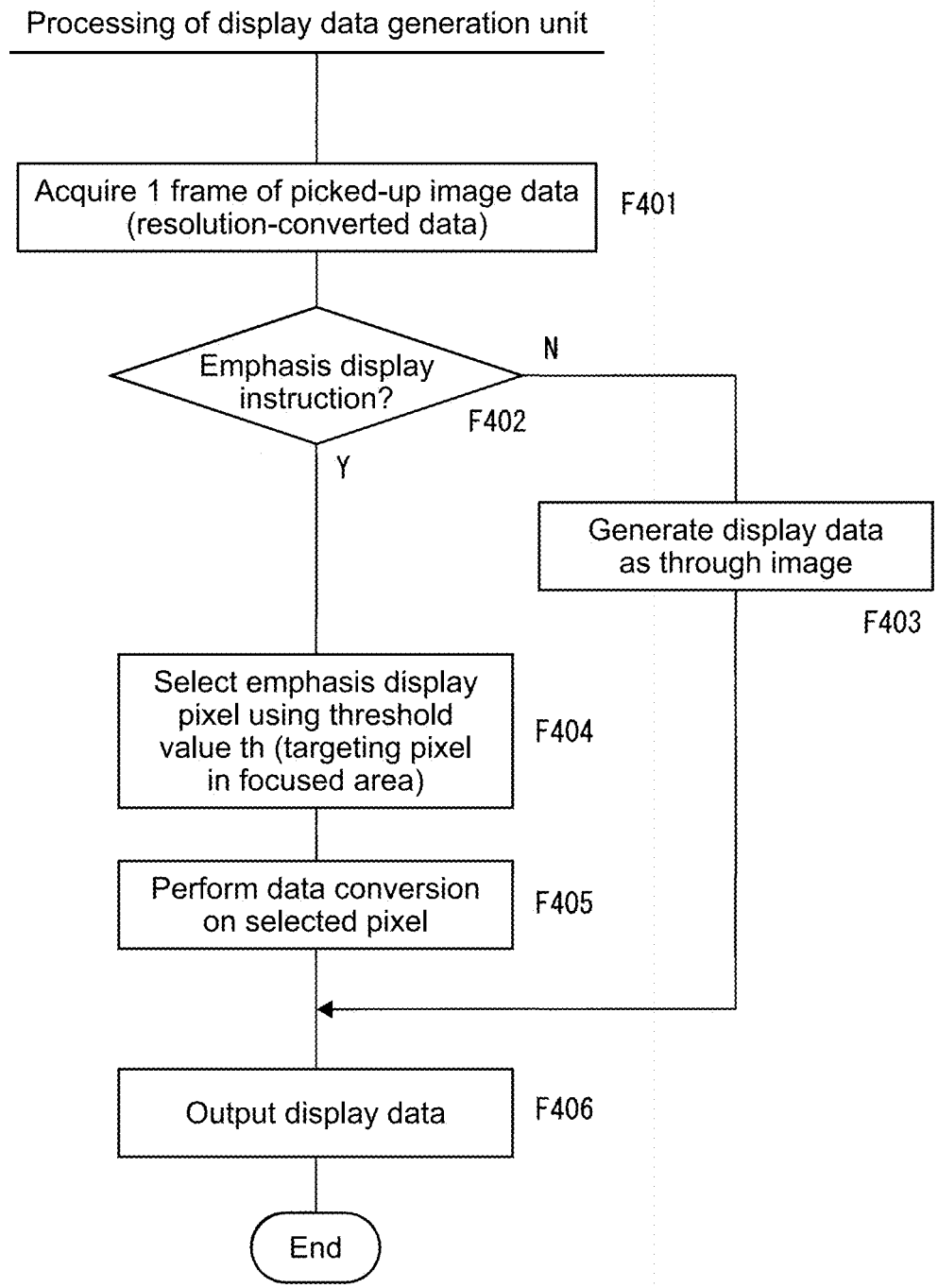
FIG. 11 is a flowchart showing processing of a display data generation unit according to the embodiment.

The processing example of the display data generation unit 26 is shown in FIG. 11.

The display data generation unit 26 acquires a single frame as picked-up image data in Step F401. In this case, the display data generation unit 26 acquires the picked-up image data subjected to the resolution conversion by the resolution conversion unit 24. By the resolution conversion unit 24 generating resolution-converted picked-up image data in a through image size (longitudinal and lateral pixel size of display unit 34), the display data generation unit 26 can use the acquired picked-up image data as through image data as it is.

While emphasis display is not executed, the processing advances from Step F402 to Step F403, and the picked-up image data resolution-converted to be used as a through image is used as it is as display data. Then, in Step F406, the display data is output to the display unit 34 so that through image display is executed.

The case where through image display is instructed in Step F101 of FIG. 6 or Step F201 of FIG. 7 has been described heretofore.

When emphasis display is instructed in Step F107 of FIG. 6 or Step F206 of FIG. 7, the display data generation unit 26 executes Steps F404 and F405 of FIG. 11 for each frame.

In Step F404, the display data generation unit 26 uses the threshold value th supplied from the controller 30 to select a pixel to be displayed with emphasis in the through image data of the current frame. Specifically, a pixel having an edge evaluation value higher than the threshold value th is selected as the pixel to be displayed with emphasis.

It should be noted that in this case, the pixel to be compared with the threshold value th is limited to the pixels in the area judged as a focused area by the focused area judgment unit 27. In other words, for pixels in the defocused area, even when there is a pixel having an edge evaluation value higher than the threshold value th, such a pixel is not used as the pixel to be displayed with emphasis. Therefore, the display data generation unit 26 also references the focused area information obtained by the focused area judgment unit 27 to select the pixel to be displayed with emphasis.

In Step F405, a pixel data conversion is performed on the pixel to be displayed with emphasis by converting a luminance or color information, performing an image synthesis such as a special outline, and the like. In this case, the emphasis level obtained by the pixel data conversion corresponds to the emphasis effect parameter EF. The through image data subjected to the data conversion for emphasis display is used as the display data.

In Step F406, the display data generation unit 26 transfers the display data including the emphasis display pixel as described above to the display unit 34 and causes through image display accompanying the emphasis display of a focused portion to be executed.

The example of the emphasis display performed by the processing of the controller 30 and the digital signal processing unit 20 as described above will be described with reference to FIGS. 12A, 12B, 13A, 13B, 14A, and 14B.

Figure 12A:
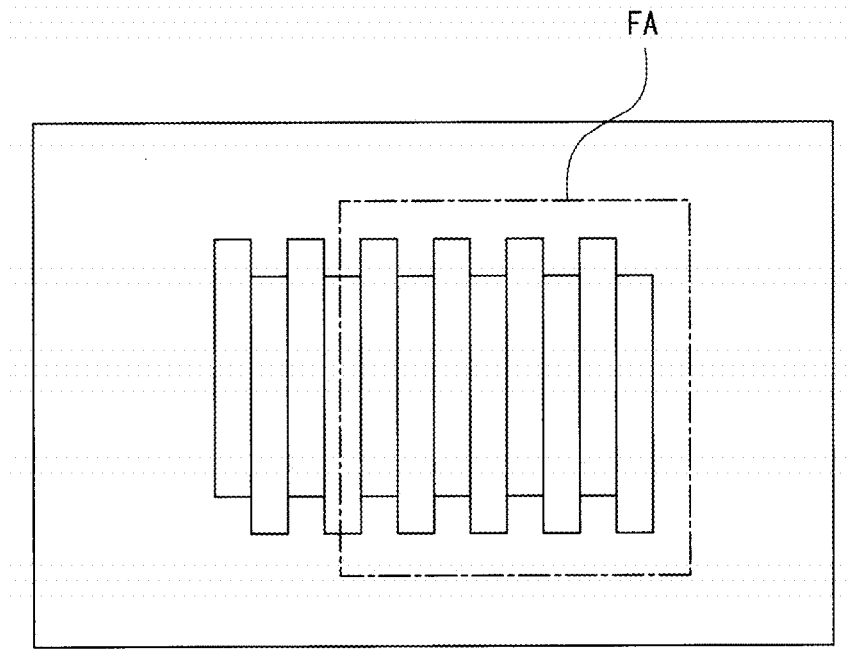
FIGS. 12A and 12B are explanatory diagrams of emphasis display according to the embodiment.

FIG. 12A is an example of an image with many longitudinal lines. In the frame of such picked-up image data, a range surrounded by a broken line Fa is being focused. In this case, the histogram described above is created for the pixels in the area w(n) included in the range of the broken line Fa, and the threshold value th is set based on the histogram.

Figure 12B:
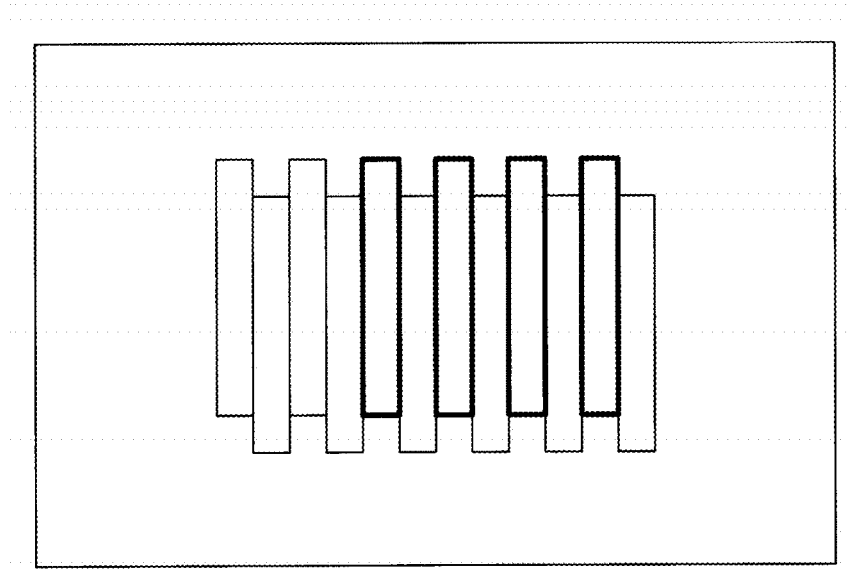

Then, targeting the focused area within the range of the broken line Fa, the emphasis display pixel is selected based on the threshold value th, and then emphasis display is performed. For example, the emphasis display as indicated by the bold lines of FIG. 12B is executed. Since this example shows an image that has many longitudinal and lateral edges in the focused area, the threshold value th is set to be high, and thus the pixel to be displayed with emphasis is limited to pixels having a fairly-high edge evaluation value. Therefore, a situation in which an edge line is emphasized more than necessary can be avoided, and adequate emphasis display is executed.

In addition, emphasis display is not performed for the defocused area outside the broken line Fa.

Figure 13A:
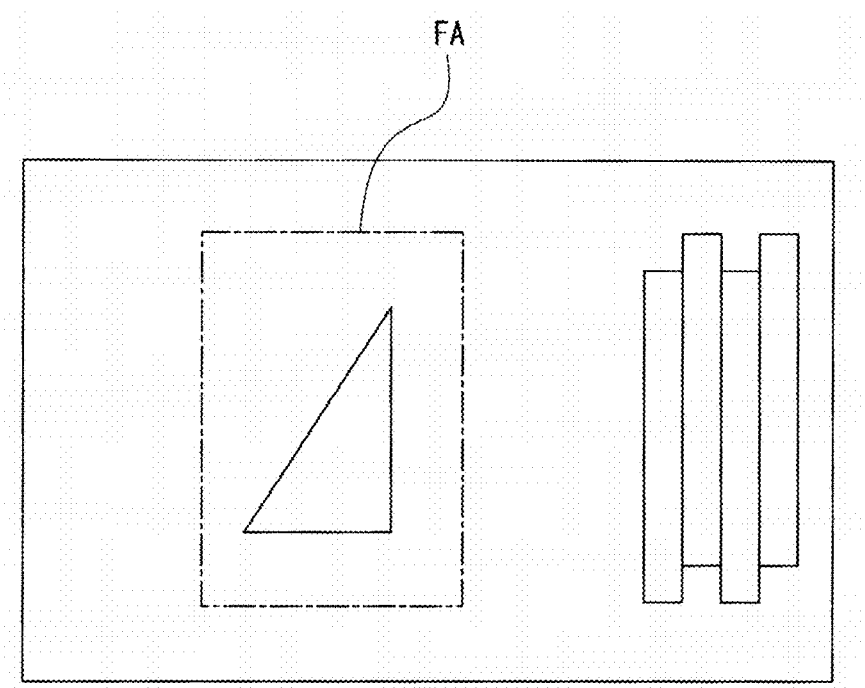
FIGS. 13A and 13B are explanatory diagrams of the emphasis display according to the embodiment.

FIG. 13A shows an example of an image with a small number of edges in a portion focused as the area inside the broken line Fa.

In the frame as the picked-up image data, the histogram described above is created for pixels in the area w(n) included in the range of the broken line Fa, and the threshold value th is set based on the histogram.

Figure 13B:
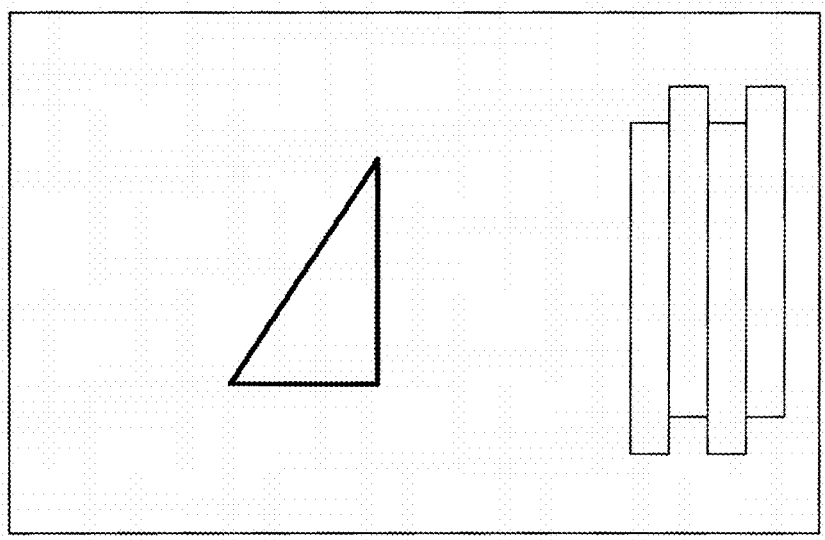

Then, targeting the focused area within the range of the broken line Fa, the emphasis display pixel is selected based on the threshold value th, and emphasis display is performed. For example, the emphasis display as indicated by the bold line of FIG. 13B is executed. Since this example shows an image that has a small number of edges in the focused area, the threshold value th is set to be low, and thus a pixel is selected as the pixel to be displayed with emphasis even with a rather low edge evaluation value. Therefore, a situation in which an edge line is not emphasized at all can be avoided, and adequate emphasis display is executed.

Also in this case, emphasis display is not performed for the defocused area outside the broken line Fa. Therefore, even when there is an edge line with a high edge evaluation value in the defocused area (since it is not the focused area, a portion having a relatively-high edge evaluation value though blurred) as shown in the figure, the edge line is not displayed with emphasis, and emphasis display appropriately expressing the focused portion is realized.

Figure 14A:
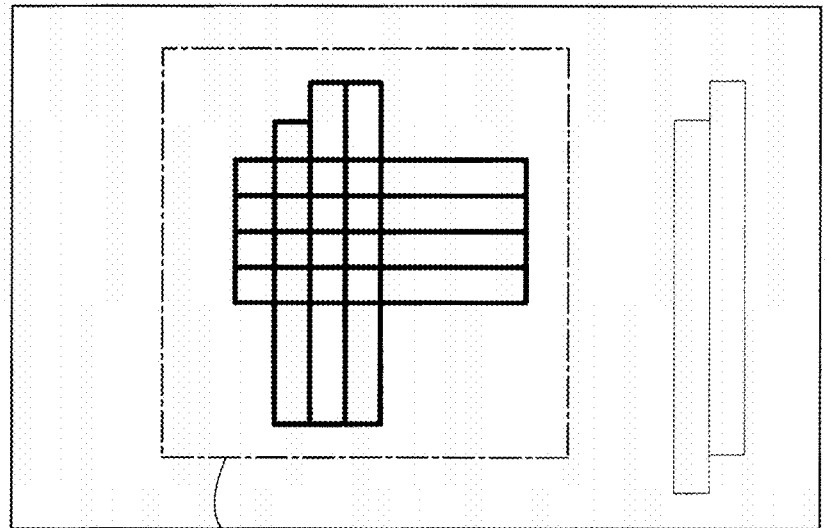
FIGS. 14A and 14B are explanatory diagrams of emphasis display that differs in the emphasis effect amount according to the embodiment.
Figure 14B:
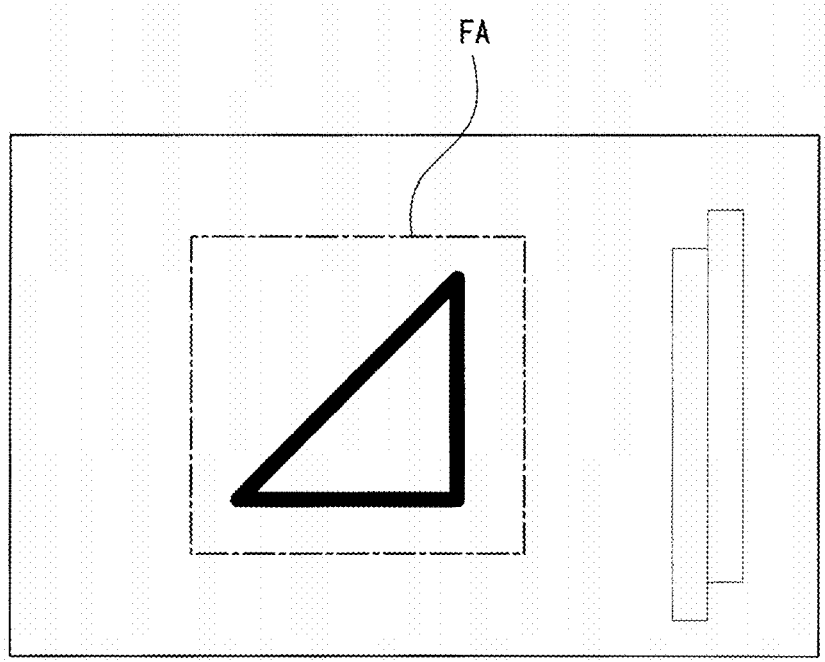

FIGS. 14A and 14B show an example for explaining an emphasis effect amount corresponding to the emphasis effect parameter EF.

For example, FIG. 14A shows a case of an image having a large number of edge lines in the focused area inside the broken line Fa, and FIG. 14B shows an example of an image having less edge lines in the focused area.

For example, it is assumed that the luminance for emphasis display is controlled based on the emphasis effect parameter EF, and the bold lines indicate a high luminance. When the emphasis effect parameter EF is set as shown in FIG. 10B, in the case of the image having many edge components as in FIG. 14A, the emphasis effect amount is reduced by the emphasis effect parameter EF, and a raising level of the luminance is reduced. On the other hand, in the case of the image having less edge components as in FIG. 14B, the emphasis effect amount is increased by the emphasis effect parameter EF, and the raising level of the luminance is increased.

By the emphasis effect amount setting corresponding to the emphasis effect parameter EF as described above, easy-to-see emphasis display is realized. In other words, if the emphasis effect amount is increased too much (luminance is increased) when there are many emphasis display portions, many high-luminance portions appear on the screen to thus result in a difficult-to-see image. In this regard, by lowering the emphasis effect amount when there are many edge components, adequately-easy-to-see emphasis display is realized. On the other hand, by raising the emphasis effect amount to a certain degree when there are a small number of edge components, recognizability of the focused portion by the user is enhanced.

It should be noted that raising and lowering the luminance of the emphasis display portion as a degree of the emphasis effect is a mere example. For example, emphasis display that boldly displays an edge line as a focused portion is also assumed. In such a case, the thickness of the edge line may be changed based on the emphasis effect parameter EF.

Moreover, emphasis display that displays an edge line as the focused area in a different color (e.g., display in red or yellow) is also assumed. In such a case, either one or both of a chroma and brightness of the edge line color may be changed compositely according to the emphasis effect parameter EF. It is of course possible to select the emphasis display color itself based on the emphasis effect parameter EF.

In either case, it is favorable to control the emphasis degree on an image to be displayed with emphasis based on the emphasis effect parameter EF.

In the image pickup apparatus 10 of this embodiment described above, the following effects can be obtained.

Specifically, the image pickup apparatus 10 includes the focused area judgment unit 27 that judges a focused area in picked-up image data of each frame, the distribution information generation unit 30a that generates distribution information (histogram) of an edge evaluation value with the focused area as a target, the threshold value setting unit 30b that variably sets the threshold value th used for judging an emphasis display portion using the distribution information, and the display data generation unit 26 that selects the emphasis display portion in the image data using the variably-set threshold value th and generating display data for displaying the selected portion with emphasis.

When the threshold value for selecting the emphasis display portion in the image data is fixed, the number of emphasis display portions becomes too large to result in a difficult-to-see image in the case of an image with many edges. In other words, an image with a messy impression with too many emphasized edges is obtained. In addition, the emphasis display is hardly made in the case of an image with a low contrast.

In this regard, in the image pickup apparatus of this embodiment, the threshold value th is varied according to an image. In particular, distribution information of edge evaluation values is generated with a focused area of the picked-up image data as a target, and the threshold value th is set using the distribution information. In other words, by observing the edge condition in the image while targeting only the focused area, the variable setting of the threshold value th is prevented from being affected by the defocused portion.

Specifically, the threshold value th is set to be relatively high in an image with a high edge ratio, and the threshold value th is set to be relatively low in an image with a low edge ratio.

By selecting an emphasis display pixel using the threshold value th as described above, a focusing assist function that facilitates visibility and hardly messes an image can be provided.

Moreover, a situation in which peaking display sticks out too much or is not displayed at all can be alleviated. In other words, emphasis display that emphasizes moderately so as not to mess an image too much in the case of an image with many edges and reacts to even a weak edge in the case of an image with less edges can be realized.

If a calculation is performed while including all other portions in addition to the focused area in generating the distribution information, the threshold value th becomes low in an image with many blurred defocused portions, and emphasis display is made with a small number of edges. However, in the case of this embodiment, such a problem does not occur, and appropriate emphasis display is performed. Specifically, by limiting a pixel to be reflected onto the distribution information to pixels in the focused area, it becomes possible to remove an influence of a defocused portion and correctly capture an image feature, and thus the threshold value th can be set properly.

Moreover, by setting the threshold value th from the distribution information of edge evaluation values targeting the focused area, unnatural emphasis display due to a change of a focus position when using emphasis display for focusing of a focus check is prevented from occurring.

The display data generation unit 26 generates display data for displaying with emphasis a portion in the focused area, that has been selected as a result of the comparison with the threshold value th, in the picked-up image data as a through image. In other words, the portion to be displayed with emphasis is only the focused area. For example, even when there is a pixel whose edge evaluation value is higher than the threshold value th, that portion is not displayed with emphasis. Accordingly, appropriate emphasis display according to the original purpose of emphasizing an object in the focused area to allow the user to check that portion is realized.

Further, the controller 30 (threshold value setting unit 30b) sets the emphasis effect parameter EF (=f2 (Ea)). Since the edge evaluation value Ea judged from the distribution information is used, the emphasis effect parameter EF becomes a parameter value corresponding to the threshold value th. Then, the display data generation unit 26 uses the emphasis effect parameter EF in the pixel data conversion operation for emphasis display. The threshold value th variably set based on the distribution information reflects thereon an image state (number of edges etc.). In this regard, by setting the emphasis effect parameter EF (emphasis effect amount information) corresponding to the threshold value th, emphasis display corresponding to the image state becomes possible. As a result, it becomes possible to improve visibility of the emphasis display and recognizability of a focused portion by the user.

For example, by setting the luminance value of the emphasis display portion using the emphasis effect parameter EF, the level of emphasis display can be adjusted by the luminance, and thus the emphasis display on the image can be made appropriate.

Moreover, the controller 30 (distribution information generation unit 30a) generates, with a contrast differential obtained as a derivative value of the luminance between adjacent pixel data as an edge evaluation value, the distribution information of the edge evaluation value (histogram). By obtaining an appropriate edge evaluation value as the derivative value of the luminance between adjacent pixel data, the edge evaluation value contributes to an appropriate threshold value setting.

Further, the controller 30 (threshold value setting unit 30b) sets the threshold value th using the edge evaluation value Ea with which an accumulative pixel count from the distribution high-order side (high-order BIN side) becomes a set pixel count ratio based on the distribution information. As a result, the threshold value th with which the number of pixels to be displayed with emphasis can be made almost constant irrespective of the image content can be set, and the easy-to-see emphasis display as described above is realized.

Furthermore, the controller 30 (threshold value setting unit 30b) sets an upper limit (th2) and a lower limit (th1) to the threshold value th as shown in FIG. 10A. Accordingly, it is possible to prevent an extreme value from being set as the threshold value th, and thus the threshold value th is not set too low in an image with a small number of edges and too high in an image with many edges. Therefore, even in an image having an extremely large (small) number of edge components, edges as an original focused portion can be accurately presented to the user.

4. Program and Application to Computer Apparatus

Heretofore, the embodiment of the image pickup apparatus 10 has been described, but the processing for the emphasis display function described above can be executed by hardware or software.

The program of this embodiment is a program that causes an operational processing apparatus such as a CPU (Central Processing Unit) and a DSP (Digital Signal Processor) to execute the processing described in the above embodiment.

Specifically, the program of this embodiment is a program that causes the operational processing apparatus to execute the processing of judging a focused area in target image data, the processing of generating distribution information of an edge evaluation value targeting the judged focused area, the processing of variably setting a threshold value used for judging an emphasis display portion using the generated distribution information, and the processing of selecting the emphasis display portion in the image data using the set threshold value and generating display data for displaying the selected portion with emphasis.

Specifically, the program of this embodiment only needs to be a program that causes the operational processing apparatus to execute the processing shown in FIG. 3.

By such a program, an apparatus that executes the emphasis display function described above can be realized by the operational processing apparatus.

Such a program can be recorded in advance onto an HDD as a recording medium incorporated into an apparatus such as a computer apparatus, a ROM in a microcomputer including a CPU, and the like.

Alternatively, the program can be temporarily or permanently stored (recorded) in a removable recording medium such as a CD-ROM (Compact Disc Read Only Memory), an MO (Magnetic Optical) disk, a DVD (Digital Versatile Disc), a Blu-ray (registered trademark) disc, a magnetic disk, a semiconductor memory, and a memory card. Such a removable recording medium can be provided as so-called package software.

Moreover, in addition to an installment in a personal computer or the like from the removable recording medium, such a program can be downloaded from a download site via a network such as a LAN (Local Area Network) and the Internet.

Such a program is suited for a wide range of provision of the image processing apparatus of this embodiment. For example, by downloading the program in a personal computer, a mobile information processing apparatus, a cellular phone, a game apparatus, a video apparatus, a PDA (Personal Digital Assistant), and the like, the personal computer and the like can be used as the image processing apparatus of the present disclosure.

Figure 15:
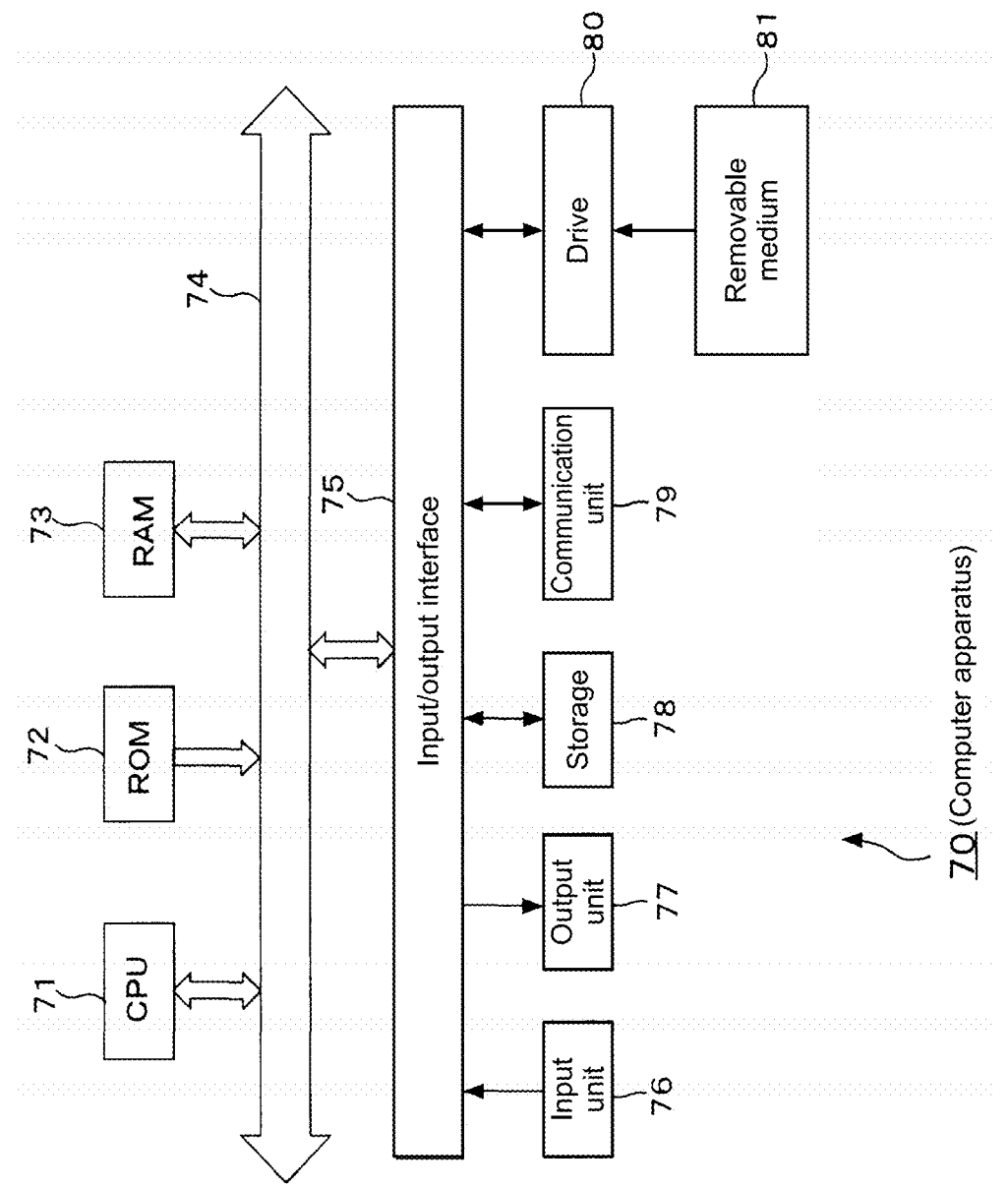
FIG. 15 is a block diagram showing a computer apparatus according to the embodiment.

For example, the same processing as the processing for the emphasis display function of the image processing apparatus 1 and the image pickup apparatus 10 described above can be executed in the computer apparatus as shown in FIG. 15.

In FIG. 15, a CPU 71 of the computer apparatus executes various types of processing according to programs stored in a ROM 72 or programs loaded to a RAM 73 from a storage 78. The RAM 73 also stores data requisite for the CPU 71 to execute the various types of processing as appropriate.

The CPU 71, the ROM 72, and the RAM 73 are mutually connected via a bus 74. Also connected to the bus 74 is an input/output interface 75.

Connected to the input/output interface 75 are an input unit 76 constituted of a keyboard, a mouse, and the like, a display constituted of a CRT (Cathode Ray Tube), an LCD, an organic EL panel, or the like, an output unit 77 constituted of a speaker and the like, the storage 78 constituted of a hard disk and the like, and a communication unit 79 constituted of a modem and the like. The communication unit 79 carries out communication processing via the network including the Internet.

A drive 80 is also connected to the input/output interface 75 as necessary, and a removable medium 81 such as a magnetic disk, an optical disc, a magneto-optical disc, and a semiconductor memory is loaded as appropriate so that a computer program read out therefrom is installed in the storage 78 as necessary.

When the processing for emphasis display described above is executed by software, a program constituting the software is installed from a network or a recording medium.

As shown in FIG. 15, for example, the recording medium is constituted of, separate from the apparatus body, the removable medium 81 such as a magnetic disk (including flexible disk), an optical disc (including Blu-ray disc, CD-ROM, and DVD), a magneto-optical disc (including MD (Mini Disc)), and a semiconductor memory, that is distributed for delivering the program to the user and on which the program is recorded. Alternatively, the recording medium is constituted of the ROM 72, a hard disk included in the storage 78, or the like recording the program, that is delivered to the user in a state where it is incorporated into the apparatus body in advance.

By the CPU 71 executing the processing described above shown in FIG. 3 based on the program when moving image data is input by a reception operation by the communication unit 79, a reproduction operation by the drive 80 (removable medium 81) or the storage 78, and the like, such a computer apparatus 70 can execute a display operation accompanying emphasis display for the input image data. For example, by inputting image data taken by the image pickup apparatus, the user can check a focused state on the image pickup apparatus side via a display (output unit 77) of the computer apparatus 70.

5. Modified Example

The embodiment above may be variously modified.

In the embodiment above, the threshold value th is generated from the distribution information of edge evaluation values for pixels in a focused area, and the emphasis display portion is limited to the focused area. However, even with the emphasis display, a defocused area may be included therein. This is because, for example, even in the defocused area, the edge evaluation values partially become fairly high in some cases. It should be noted that the threshold value for selecting a pixel to be displayed with emphasis in the defocused area may be higher than the threshold value th for the focused area.

The emphasis display method includes raising the luminance or changing colors. However, the method may vary. When changing the luminance, emphasis display is realized by lowering the luminance in some cases. In the case of an image in which the entire image has an extremely-high luminance, for example, by lowering the luminance of only the emphasis display portion, the user can easily recognize the focused portion.

Moreover, the pixel to be displayed with emphasis is not limited to the edge, and the entire object portion surrounded by an outline as the edge selected by the threshold value th may be displayed with emphasis, for example.

Further, although the embodiment above has taken the example where a still image is taken, the emphasis display is also effective when a moving image is taken. For example, emphasis display is made on a through image in a standby state before pickup/recording of a moving image is started. Alternatively, it is useful to perform emphasis display on a through image being monitored.

The processing for emphasis display does not need to be performed for each frame and may be executed for intermittent frames such as every other frames and every 2 frames. Accordingly, a processing load for the emphasis display function is alleviated.

It should be noted that the present disclosure may also take the following structures:

(1) An image processing apparatus, including:

a focused area judgment unit configured to judge a focused area in target image data;

a distribution information generation unit configured to generate distribution information of an edge evaluation value with the focused area judged by the focused area judgment unit as a target;

a threshold value setting unit configured to variably set a threshold value used for judging an emphasis display portion using the distribution information generated by the distribution information generation unit; and a display data generation unit configured to select an emphasis display portion in the image data using the threshold value set by the threshold value setting unit and generate display data for displaying the selected portion with emphasis.

(2) The image processing apparatus according to (1) above, in which the display data generation unit generates display data for displaying with emphasis a portion inside the focused area, that has been selected based on a result of a comparison with the threshold value, within the image data.

(3) The image processing apparatus according to (1) or (2) above, in which the threshold value setting unit sets emphasis effect amount information corresponding to the threshold value, and in which the display data generation unit uses the emphasis effect amount information in a pixel data conversion operation for display with emphasis.

(4) The image processing apparatus according to (3) above, in which the display data generation unit sets a luminance value of the emphasis display portion using the emphasis effect amount information.

(5) The image processing apparatus according to any one of (1) to (4) above, in which the distribution information generation unit generates the distribution information of the edge evaluation value using a contrast differential obtained as a derivative value of a luminance between adjacent pixel data as the edge evaluation value.

(6) The image processing apparatus according to any one of (1) to (5) above, in which the threshold value setting unit sets, based on the distribution information generated by the distribution information generation unit, the threshold value using the edge evaluation value with which an accumulative pixel count from a distribution high-order side becomes a set pixel count ratio.

(7) The image processing apparatus according to any one of (1) to (6) above, in which the threshold value setting unit provides an upper limit and a lower limit to the threshold value to be set.

(8) An image processing method, including:

judging a focused area in target image data;

generating distribution information of an edge evaluation value with the judged focused area as a target;

variably setting a threshold value used for judging an emphasis display portion using the generated distribution information; and selecting an emphasis display portion in the image data using the set threshold value and generating display data for displaying the selected portion with emphasis.

(9) A program that causes an operational processing apparatus to execute the processing of:

judging a focused area in target image data;

generating distribution information of an edge evaluation value with the judged focused area as a target;

variably setting a threshold value used for judging an emphasis display portion using the generated distribution information; and selecting an emphasis display portion in the image data using the set threshold value and generating display data for displaying the selected portion with emphasis.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus, comprising:
a focused area judgment unit configured to judge a focused area in target image data;
a distribution information generation unit configured to generate distribution information of an edge evaluation value with the focused area judged by the focused area judgment unit as a target,
wherein the distribution information generation unit generates the distribution information of the edge evaluation value using a contrast differential obtained as a derivative value of a luminance between adjacent pixel data as the edge evaluation value;
a threshold value setting unit configured to variably set a threshold value used for judging an emphasis display portion using the distribution information generated by the distribution information generation unit; and
a display data generation unit configured to select an emphasis display portion in the image data using the threshold value set by the threshold value setting unit and generate display data for displaying the selected portion with emphasis.

2. The image processing apparatus according to claim 1, wherein the display data generation unit generates display data for displaying with emphasis a portion inside the focused area, that has been selected based on a result of a comparison with the threshold value, within the image data.

3. The image processing apparatus according to claim 1, wherein the threshold value setting unit sets emphasis effect amount information corresponding to the threshold value, and
wherein the display data generation unit uses the emphasis effect amount information in a pixel data conversion operation for display with emphasis.

4. The image processing apparatus according to claim 3, wherein the display data generation unit sets a luminance value of the emphasis display portion using the emphasis effect amount information.

5. The image processing apparatus according to claim 1, wherein the threshold value setting unit sets, based on the distribution information generated by the distribution information generation unit, the threshold value using the edge evaluation value with which an accumulative pixel count from a distribution high-order side becomes a set pixel count ratio.

6. The image processing apparatus according to claim 1, wherein the threshold value setting unit provides an upper limit and a lower limit to the threshold value to be set.

7. An image processing method, comprising:
judging a focused area in target image data;
generating distribution information of an edge evaluation value with the judged focused area as a target,
wherein the distribution information of the edge evaluation value is generated using a contrast differential obtained as a derivative value of a luminance between adjacent pixel data as the edge evaluation value;
variably setting a threshold value used for judging an emphasis display portion using the generated distribution information; and
selecting an emphasis display portion in the image data using the set threshold value and generating display data for displaying the selected portion with emphasis.

8. A non-transitory computer readable medium having stored thereon, a set of computer-executable instructions that causes an operational processing apparatus to execute the processing of:
judging a focused area in target image data;
generating distribution information of an edge evaluation value with the judged focused area as a target,
wherein the distribution information of the edge evaluation value is generated using a contrast differential obtained as a derivative value of a luminance between adjacent pixel data as the edge evaluation value;
variably setting a threshold value used for judging an emphasis display portion using the generated distribution information; and selecting an emphasis display portion in the image data using the set threshold value and generating display data for displaying the selected portion with emphasis.

\* \* \* \* \*